(12) United States Patent
Fahldieck et al.

(10) Patent No.: US 11,155,423 B2
(45) Date of Patent: Oct. 26, 2021

(54) BEVERAGE BOTTLE HOLDING AND TRANSPORT DEVICE FOR HOLDING AND TRANSPORTING BEVERAGE BOTTLES AND SIMILAR CONTAINERS

(71) Applicants: Andreas Fahldieck, Idar-Oberstein (DE); Nils Schug, Riesweiler (DE)

(72) Inventors: Andreas Fahldieck, Idar-Oberstein (DE); Nils Schug, Riesweiler (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/186,221

(22) Filed: Feb. 26, 2021

(65) Prior Publication Data

US 2021/0206584 A1    Jul. 8, 2021

Related U.S. Application Data

(63) Continuation-in-part of application No. PCT/EP2019/069008, filed on Jul. 15, 2019.

(30) Foreign Application Priority Data

Aug. 29, 2018  (DE) .......................... 102018121092.2

(51) Int. Cl.
*B65G 47/86* (2006.01)
*B25J 9/10* (2006.01)

(52) U.S. Cl.
CPC ............ *B65G 47/847* (2013.01); *B25J 9/109* (2013.01); *B65G 2201/0244* (2013.01)

(58) Field of Classification Search
CPC ........ B65G 47/847; B67C 2/242; B67B 3/206
USPC .................. 198/803.7, 803.9; 53/331.5, 367
See application file for complete search history.

(56) References Cited

U.S. PATENT DOCUMENTS

| 7,264,113 | B2 * | 9/2007 | Hartness | ................ B65G 17/06 198/470.1 |
| 8,439,413 | B2 * | 5/2013 | Cirio | ....................... B67C 3/242 294/116 |
| 10,569,424 | B1 * | 2/2020 | Green | ................... B25J 15/0028 |
| 2011/0266818 | A1 | 11/2011 | Cirio et al. | |

FOREIGN PATENT DOCUMENTS

| DE | 102006003142 | 8/2007 |
| DE | 102012108087 | 5/2014 |
| DE | 102015106103 | 10/2016 |
| DE | 102016123640 | 3/2018 |
| IT | TO20120298 | 10/2013 |
| WO | 2006102983 | 10/2006 |
| WO | 2015082381 | 6/2015 |
| WO | 2016071198 | 5/2016 |

* cited by examiner

*Primary Examiner* — Gene O Crawford
*Assistant Examiner* — Lester Rushin, III
(74) *Attorney, Agent, or Firm* — Myers Duffy Dansak & Clegg LLC

(57) ABSTRACT

The application discloses a beverage bottle holding and transport device for holding and transporting beverage bottles and similar containers.

20 Claims, 14 Drawing Sheets

BEVERAGE BOTTLE HOLDING AND TRANSPORT DEVICE FOR HOLDING AND TRANSPORTING BEVERAGE BOTTLES AND SIMILAR CONTAINERS

CROSS-REFERENCE TO RELATED APPLICATIONS

The present application is a Continuation-in-Part of International Patent Application No. PCT/EP2019/069008, filed Jul. 15, 2019, which claims the benefit of Federal Republic of Germany Patent Application No. DE102018121092.2, filed Aug. 29, 2018, each of which is incorporated by reference herein in its entirety.

BACKGROUND INFORMATION

1. Technical Field

The application discloses a beverage bottle holding and transport device for holding and transporting beverage bottles and similar containers.

2. Background Art

This section is for informational purposes only and does not necessarily admit that any publications discussed or referred to herein, if any, are prior art. Beverage bottle filling machines, or simply filling machines, are used in the beverage bottle filling or bottling industry to fill bottles with a liquid beverage. Such machines can be of a rotary or linear design. Rotary beverage bottle filling machines include a rotary carousel or rotor or similar structure that has a plurality of individual beverage bottle filling devices or beverage bottle filling stations mounted or positioned on the perimeter or periphery thereof. In operation, an individual beverage bottle is received or picked up from a bottle or container handling device or machine, such as another bottle treatment machine or a container transport or conveyor, which can be either of a rotary or linear design, and held at a corresponding individual filling device or station. While the rotary carousel rotates, each individual filling device or filling station dispenses a beverage, such as soft drinks and sodas, wine, beer, fruit juices, water, or other beverages, or another liquid product. Each individual filling device is usually designed to fill one beverage bottle or similar container at a time. Upon completion of filling, the beverage bottle or container is released or transferred to yet another bottle or container handling device or machine, such as another bottle treatment machine or transport device. The filling devices are therefore designed to fully dispense a predetermined or desired amount or volume of product into the beverage bottles or containers before the beverage bottles or containers reach the exit or transfer position out from the filling machine. The beverage bottle filling machine can also be of a linear design, wherein beverage bottles are moved to one or more filling positions along a straight or linear path.

Such filling machines are usually part of a filling or bottling plant, wherein the filling machine operates in conjunction with a number of other beverage bottle or container handling machines, such as a closing machine for placing caps or closures on filled containers, a container manufacturing machine for making or forming containers to be filled, and a container packaging machine for packaging individual containers for shipment and sale to consumers. Such plants are designed to operate as quickly and continuously as possible, and any interruptions in operation result in a loss of productivity and an increase in operating costs, especially since such plants can process large numbers of containers, such as, for example, anywhere from sixty to one hundred thousand containers per hour.

Transport devices with container clamps for transporting containers, such as beverage bottles, are made in different configurations in the field of beverage bottling or container handling technology. These are used, for example, in the sector of the food processing industry, in order to hold containers such as beverage bottles during manufacture, filling, or also cleaning. In this context, container clamps must be of particularly simple structural design and easy to clean in order to fulfil the high demands for hygiene. If there are too many components or complex structural design, then the areas that need to be cleaned are increased, thereby increasing the likelihood of build up of contaminants and decreased cleanliness.

Some container clamps in the beverage bottle handling technology have a simple structural design, with two rotatably mounted gripper arms, at the free ends of which a blocking element is pushed between two elastic sections of the gripper arms in order to hold the gripper arms on the container. Such container clamps and other similar container clamps present disadvantages, such as, for example, the holding force being difficult to control and the lack of self-restriction of the clamps against unintentional upwards movement.

BRIEF SUMMARY

At least one exemplary embodiment is based on the object of providing a transport device with a container clamp which is of simple structural design and easy to clean, which requires small structural space, offers or promotes relatively precise control, and which has protection against unintentional upwards movement. This object is achieved by a device for transporting beverage bottles or containers according to at least one exemplary embodiment disclosed herein.

The device according to at least one exemplary embodiment for transporting containers comprises a carrying body with a container clamp having two gripper arms for holding a container in the region of its shoulder or neck, wherein each gripper arm is mounted so as to pivot about a vertical pivot axis of a gripper arm pin. A control unit for actuating the gripper arms is arranged mounted on the carrying body such as to rotate about an axis of rotation, and an actuating device coupled to the control unit is provided for carrying out actuation by a control cam. Each gripper arm has at an outer end a gripping section for receiving the container, and, at an inner end opposite the outer end, in each case a control slot, wherein the respective gripper arm pin is arranged between the two ends. The control unit comprises a rotatably mounted basic body with control slot pins arranged on it, and each control slot pin is mounted so as to move in the respective control slot in one of the gripper arms, such that, with a rotational movement of the control unit, the control slot pins move in the control slots in opposite directions, and the gripper arms are pivoted about the pivot axis between an open position and a gripping position.

The configuration of the device according to at least one exemplary embodiment, with a control unit rotatable about a single control unit pin, and a transfer of force from the control unit onto the gripper arms by two control slot pins and two control slots, advantageously promote an exact or high degree of control of the opening and closing movement of the gripper arms and of the force to be applied for this purpose. In addition, a self-restriction effect is achieved, which reliably prevents or minimizes an unintentional opening of the gripper arms. The structural design of the device still remains very simple, and comprises only a few main components, as a result of which it remains easy to clean.

As a result of the single control unit pin for the control unit, with the force transfer onto two control slot pins, the situation is attained that no linear guidance arrangements are present which are difficult to clean, and the angle of rotation required for the opening and closing of the gripper arms is small or minimized, as a result of which the wear on the moving parts is minimized.

The term "transport device" is understood to mean devices which transport empty and/or full containers through a container treatment system. In particular, these devices are understood to be transport devices which transport the container through a container treatment station or out of a container treatment station or into a container treatment station respectively. The transport device is configured for the transport of containers which are standing upright or by what is referred to as neck handling, i.e., being held beneath the neck ring of the bottle mouth and, in most cases, suspended by the neck ring. It should also be understood that the terms "pin" or "pins" refer to any type of solid structure that is elongated, i.e., having a length that is greater or substantially greater than its width or diameter. A "pin" or "pins" refers to and includes any similar structures, such as rods, posts, axles, shafts, or any other such structures that are elongated and have a central longitudinal axis.

A carrying body is understood to be a basic body that carries the container clamp and the control unit. In this situation, the mounting on the carrying body is provided exclusively by way of the gripper arm pins and the control unit pin, which are rotatably mounted on the carrying body. The gripper arm pins in this situation are aligned vertically. It is understood by this that the gripper arm pins stand perpendicular on a plane of the carrying body. Since the carrying body in its installation position is usually aligned horizontally in its plane, the gripper arm pins are aligned vertically when in the installed position.

Container clamps are understood to be devices for holding individual containers. The container clamps can hold the containers alone or in conjunction with other structures, such as a further component part of the device or an adjacent device configured to support the container base or its outer surfaces, in order to, for example, absorb centrifugal forces which are incurred to protect the container against falling over.

In order to hold the container, the gripper arms of a container clamp, which can each rotate about their gripper arm pins, take effect or cooperate together to grip the container at least in sections. In this situation, the gripper arms engage around the container in the neck region, i.e., in a region between the container opening and the container shoulder.

Containers are understood to be, in particular, beverage containers, such as beverage bottles, in particular beverage bottles with neck rings.

In the open position, the gripper arms are spread apart from one another, and a container can be moved into the container clamp, i.e., between the gripper arms. Accordingly, the gripping position is understood to be a position in which the gripper arms are at least closed to the greatest extent, and have adopted a position in which they can hold a container. The gripper arms grip the container with a gripping section, which, for example, is matched or shaped to grip the shape of the neck region of the container at which the gripper arms are in contact.

Accordingly, the gripping section is understood in each case to be the sections of the gripper arms which come in contact with the container when the container is being held. The gripping sections are arranged at a first free end of the gripper arms. Due to the container clamp being used mainly at a transport star, where the gripping sections, or first free end, point outwards in the radial direction, the first free ends are designated as outer ends. The second free ends, opposite the first free ends, in this situation point inwards in the radial direction, in the direction of a transport star axis of rotation, and are designated as inner ends. Transport stars are component parts of a container transport device, which carry out a rotating transport of the containers.

Arranged in each control slot in each case is a control slot pin. The control slot and control slot pin are preferably configured as a sliding block control arrangement, or a sliding block guide and sliding block. In this situation, the control slots are arranged at the second free ends or inner ends, opposite the gripping sections or outer ends, of the gripper arms, and the respective gripper arm pins are arranged between the gripping section and the control slot. The control slots are closed slots with an uninterrupted or closed outer edge, but could alternatively be formed, for example, as open at the second free end. In closed control slots, the control slot pins can only be moved out of the control slot transversely to their direction of movement in the control slot, such as perpendicular to the plane of the respective gripper arm.

A relatively small or minimized structural space of the device is attained according to at least one exemplary embodiment, among other factors, by an arrangement of the control slot pins, by which, at the rotational movement of the control unit, the control slot pins move in opposite directions in the control slots. For this purpose, the control slots extend at least as far as possible in the longitudinal axial direction of the gripper arms, or, respectively, in the longitudinal axial direction of the central longitudinal axis of the container clamp, accordingly, for example, with a transport star, as far as possible in the radial direction. With regard to the control slot pins, this means that, in a starting position, such as, for example, the open position of the gripper arms, one of the control slot pins points is arranged in a section of the control slot pointing towards the inner end of a first gripper arm, and the second control slot pin is arranged in a section of the control slot of the second gripper arm which points towards the outer end or gripping section. It is of course also possible for the arrangement to be the other way round.

Due to the rotational movement of the control unit about its control unit pin, the control slot pin, which is located in a section of a control slot of a first gripper arm oriented towards the inner end, moves in the direction of the outer end of the control slot of the first gripper arm, while the second control slot pin moves in the control slot in the direction of the inner end of the second gripper arm. That is to say, for example with a transport star, that one of the control slot pins moves at least as far as possible in the direction radially outwards, and the other control slot pin moves at least as far as possible in the direction radially inwards or in the direction towards the axis of rotation of the transport star. The movements of the control slot pins take place in this situation simultaneously. In other words, the control slot pins can be moved simultaneously or essentially simultaneously in what could be referred to as a mirror or symmetrical movement, wherein the first control slot pin moves in a substantially radial direction, with respect to the rotor on which the gripper arms are disposed, inwardly while the second control slot pin moves in a substantially radial direction outwardly, or vice versa.

To initiate the rotational movement of the control unit, an actuating device is arranged so as to actuate the control unit. The actuating device may comprise a control roller that is moved by a control cam. The control cam is arranged in a fixed manner to a non-rotating part of the transport device.

The actuating device is coupled to the control unit in such a way that the movement of the control roller which is produced is converted into the rotational movement of the control unit about its control unit pin. For this purpose, the control unit can comprise a carrying arm, arranged at which is the actuating device, such as the control roller. This carrying arm can extend out of the main body of the control unit.

The actuating device also may comprise a central longitudinal axis, for example, an axis of rotation of the control roller, which is aligned parallel to the control unit pin of the control unit, in order to improve the compactness of the device still further.

According to a further exemplary embodiment, the device comprises carrying arms extending out of the main body, wherein a control slot pin is arranged at each carrying arm. The carrying arms for the control slot pins, also referred to hereinafter as control slot pin carrying arms, can extend with a first end out of the main body in the form of a rod or elongated structure, while at the second end, opposite the first end, a further control slot pin is arranged. For this purpose, the control slot pin carrying arms can in each case comprise a control slot pin receiver in the region of both ends. The control slot pin carrying arms extend out of the main body, for example, from sections which are as far as possible opposite one another. As an alternative, the carrying arms can also be arranged at an angle in the range of 25° to 45° to one another.

The main body and/or the carrying arms can be arranged parallel to the plane of the carrying body. In this situation, the plane of the carrying body in the installed position may be oriented horizontally. A compact or minimized structural shape, such as a shape that is relatively narrow in the vertical direction, can be formed by carrying arms being arranged at angles. In this situation, the carrying arms comprise a cut-out opening or a passage opening, in which the control slot pin receivers are arranged, i.e., in which the control slot pin receivers are located between an upper side and a lower side of the carrying body. In this situation, the main body can be arranged, by the angular formation of the carrying arms, so as project at least in sections out over the underside, as a result of which it is provided with adequate room for movement for its rotation.

The carrying arm for the actuating device can be formed as arranged at one of the control slot pin carrying arms, or at one of the control slot pin receivers, or, respectively, as an extension of one of the control slot pin carrying arms. By analogy with the control slot pin receiver, it can comprise a receiver for the actuating device.

According to a further exemplary embodiment, the control slots are formed at least in sections as curved in shape, as a result of which an improved self-restriction of the gripper arms is attained.

In this situation, the control slots are formed in such a way that the movement of the gripper arms between the respective open position and the gripping position does not take place synchronously, but unequally and not linear to the angle setting of the control unit. "Curved in shape" is understood to mean that the central longitudinal axis of each of the control slots does not run linearly.

The movement of the control slot pins, however, even with curved control slots, continues to be as far as possible in opposite directions, as a result of which, with the rotational movement of the control unit, one control slot pin is moved, for example, radially, inwards or in the direction of the second free end of the gripper arms, and the other control slot pin is moved, for example, radially, outwards or in the direction towards the gripping section. Both control slot pins may exhibit the same or essentially the same direction of rotation about the axis of rotation of the control unit.

A further simplification of the structural design is achieved according to at least one exemplary embodiment in that the control slot pins, the gripper arm pins, and the control unit pin are arranged parallel. Parallel is understood to mean that the respective central longitudinal axes are aligned in parallel. In this situation, the component parts referred to may exhibit a circular or rounded cross-section and can be configured in the form of a pin or rod or similar structure. It should be understood that the terms "parallel" and "perpendicular," as used herein, describe relationships between at least two structures or axes or planes that are exactly parallel or perpendicular, essentially parallel or perpendicular, or substantially parallel or perpendicular.

Due to the fact that the control unit pin stands or is oriented, in at least one exemplary embodiment, perpendicular to the plane of the carrying body or in the installed position vertically, and since the central longitudinal axis thereof is parallel to the central longitudinal axes of the control slot pins and the gripper arm pins, the control slot pins and the gripper arm pins are also arranged perpendicular to the plane of the carrying body. That is to say, the central longitudinal axes of the component parts referred to stand perpendicular on the plane of the carrying body. In the installed state, the central longitudinal axes are therefore possibly oriented vertically.

In order to reduce the structural height of the device still further, provision is made, according to at least one exemplary embodiment, for the control slots to be arranged next to one another. That is to say, the control slots are arranged in the direction of the plane of the carrying body, i.e., in the installation position, such as in the horizontal direction next to one another, and possibly also arranged on the same plane. As well as the control slots, the whole of the gripper arms can also be arranged in one plane and therefore next to one another, such that, in the direction perpendicular onto the plane of the carrying body, or, in the installed position, such as in the vertical direction, the control slots and possibly also the whole of the gripper arms are arranged at the same height. In this situation, the gripper arms can be oriented parallel to the plane of the carrying body.

In order to reduce the structural height of the device still further, between an upper side and a lower side of the carrying body, a cut-out or opening is formed at least for each container clamp, wherein the control unit and/or the actuating device are arranged at least partially in the respective opening and between the upper side and the lower side. As a result of this, a particularly compact or minimized structural design of the device in the vertical direction can be attained.

In another exemplary embodiment, the control unit pin of the control unit is arranged between the control slot pins, as a result of which the structural space of the device is further reduced. In this situation, the control unit pin of the control unit is arranged in the direction of the plane of the carrying body and between the control slot pins. It is therefore possible, for example, for the control unit pin of the control unit to be placed on the central longitudinal axis of the container clamp, and the control slot pins to the right and left of the central longitudinal axis of the container clamp.

The arrangement of the control unit pin at the control unit can be effected, for example, directly at the main body, such that a control unit pin receiver is arranged directly at the main body. For example, with a round or oval configuration, the arrangement of the control unit pin may be as far as possible in the middle or centrally at the main body. According to at least one exemplary embodiment, however, a control unit pin arm extending out of the main body is arranged with a control unit pin receiver so as to receive the control unit pin. The control unit pin can therefore be arranged off-center at the main body. The control unit pin arm extends, in a similar manner to the carrying arms for control slot pin receivers, out of the main body. It is arranged, as viewed in the horizontal direction, between the carrying arms, and can, for example, likewise be configured as angular. The control unit pin arm, with the control unit pin receiver, can also be arranged as far as possible in the cut-out or opening of the carrying body, and therefore in the vertical direction between the upper side and under side of the carrying body.

Both the control unit pin arm and the carrying arms effectively form lifting arms, which are located with one end at the main body, and at the other end surround the control unit pin receiver or, respectively, the control slot pin receivers. The angle between the control unit pin arm and the carrying arms in this situation can amount to between 17.5° and 25°, +/−2.5°.

In the event of lateral forces occurring, in order to prevent or minimize a change in the distance interval between the control slot pins, and therefore a blocking of the movement of the control slot pins in the control slots, according to at least one exemplary embodiment a bridge is provided, which connects the two control slot pins. The bridge, together with the two carrying arms of the control slot pins and the main body, forms a frame, which keeps the distance interval constant between the control slot pins.

The bridge may be arranged at the control slot pins on the side of the carrying body opposite the gripper arms. This means, for example, that it can be located in the direction of the upper side of the carrying body, while the gripper arms are arranged in the direction of the under side. The bridge preferably projects over the upper side of the carrying body. In order to improve the movement guidance of the control slot pins still further, provision is also made for the bridge to be rotatably mounted at the control unit pin. For this purpose, a sliding bearing, possibly at least half-sided, is formed, which is in contact at the control unit pin. In this situation, the sliding bearing may exhibit a grooved or toothed inner support or contact portion, such that a plurality of narrow contact surfaces are provided between the bridge and the control unit pin. Due to the rotational movement of the bridge, the narrow contact surfaces are alternately exposed, which results in relatively easy cleaning, for example flushing, being possible.

In order to secure the control unit to the bridge, two blocking elements can be formed at the carrying body, in this case at a control unit pin bearing. In this situation, the blocking elements are matched to the sliding bearing with its grooved or toothed inner support or contact portion in such a way that, in a removal position of the control unit, and with prior disassembly of the gripper arms, the bridge can be moved past the blocking elements vertically in the direction of the under side of the carrying body. This means that the control unit, with the bridge, can therefore be dismantled from the carrying body and also installed relatively easily, vertically in the direction of the under side. In addition, no separate securing structures or devices are necessary for securing the control unit to the bridge.

In the event of lateral forces being incurred when in operation, displacements may occur between the control slot pin receivers and, respectively, the frame described heretofore and the control unit pin arm with the control unit pin receiver. In order to dampen the lateral forces, provision is made according to at least one exemplary embodiment for an elastic bearing to be arranged in each case between the control unit pin arm and the carrying arms, which can produce a preliminary tension force between the control unit pin arm and the control slot pin receiver. As elastic bearings, use can be made of elastic toroidal sealing ring sections. The elastic bearings are designed and positioned to press the carrying arms away from the control unit pin arm by exerting a pressure force or tensioning force on the carrying arms. This tension force ensures or promotes that the frame, i.e., the control slot pins, after the removal of the lateral forces, is moved back again into its starting position.

As an alternative to the embodiment of the actuating device referred to earlier, with a carrying arm extending out of the main body, to which the control roller is secured, according to at least one exemplary embodiment provision is made for the actuating device to engage directly at a control slot pin. This embodiment can be used with an arrangement of the control unit pin at the main body by a rotating arm. For this purpose, one of the control slot pins can be lengthened and provided, for example, as a receiver for the control roller of the actuating device. The control slot pin then projects, for example, over the under side of the carrying body. Inasmuch as a control roller is likewise arranged at the control slot pin, engaging in the control slot, it is then possible, for example, for two separate rotatable control rollers to be arranged behind one another in the longitudinal axial direction of the control slot pin.

According to at least one exemplary embodiment, provision is also made for the gripper arms in the open position to exhibit an opening angle of between 4° to 15°, or between 5° to 10°, and in the gripping position an opening angle of 0° to 5°, or between 1° to 3°.

The opening angle relates to the central longitudinal axes of the gripper arms. The opening angle allows for a relatively small or minimized working width of the container clamp, as a result of which the distance interval of the container clamps can be reduced, for example on a transport star, or, respectively, the number of container clamps on the transport star can be increased. The time for opening and closing the container clamps is also relatively short or minimized.

Due to the special arrangement of the control unit, control slot pins, and control cams, only a small or minimized rotational movement of the control unit is necessary for the opening and closing of the gripper arms. In this context, provision is made according to at least one exemplary embodiment that, between the open position and the gripping position of the container clamp, the control unit runs through a rotation angle of between −45° to +45°, or possibly −30° to +30° or smaller, wherein these two angles must not or should not or may not necessarily be identical.

Due to the small or minimized rotation angle, the control cams can be relatively short or have a minimized length, such as with a length for opening from 50 to 120 mm and for closing from 30 to 90 mm. As a result of this, the structural space required can be particularly small or minimized, high switching speeds for high bottle capacities become possible, manufacturing costs are reduced, and the cleaning of the device is made easier. The possibility is also provided, due to the control cam being configured as short or minimized, of arranging pushers for ejecting the containers from the device.

To simplify the movement of the gripper arms, such as the closing movement, and to provide increased securing of the gripper arms in the gripping position, provision is made according to at least one exemplary embodiment for a spring element. The spring element is designed to subject the container clamps to a preliminary tension force into the gripping position, wherein the spring element is arranged in such a way that the rotation of the control unit for opening the container clamp takes place against the force of the spring element.

The spring element is configured in at least one exemplary embodiment as a tension spring, and causes the automatic closing of the gripper arms as soon as no active control effect or displacement force is being exerted by the actuating device. For this purpose, the spring element is arranged, for example, with a first end at the carrying body, and with a second end, opposite the first end, at the control unit or, for example, at the actuating device.

The securing of the spring elements to the carrying body or the control unit respectively, or to the actuating device, can be effected by securing elements, such as securing pins, of which the central longitudinal axis may be arranged parallel to the control unit pin. In this situation, the securing of the spring element on the side opposite the securing to the carrying body is provided by a spring carrying arm, at which the spring element is arranged. The spring carrying arm can be arranged with a first end at the control unit, for example the main body, such as at one of the control slot pin carrying arms, one of the control slot pin receivers, or the carrying arm or the receiver for the actuating device. The free second end of the spring carrying arm, opposite the first end, also comprises a receiver, which is provided, for example, for the bearing mounting of the securing element, such as, for example, of the securing pin, and for securing the spring element. The spring carrying arm, like the carrying arm for the actuating device and/or the control slot pin carrying arm, can be configured in the form of a rod, and also can be oriented parallel to the plane of the carrying body. A central longitudinal axis of the securing element is possibly likewise oriented parallel to the control unit pin of the control unit.

It may occur, such as with a spring element and/or a control roller, due to the constant movement of these parts, that dirt contamination occurs, for example in the form of wear particles or residues of cleaning agents or flushing water. In order to increase the safeguarding of the containers against dirt contamination, provision is made, according to at least one exemplary embodiment, for the spring element and a control roller to be arranged in the longitudinal axial direction of the control unit pin beneath the gripper arms. In this situation, beneath relates to the installation position of the device, as a result of which "beneath" signifies beneath or under in the vertical direction.

Consequently, the openings of bottles being handled can be arranged or positioned above the spring element and the control roller, and any dirt contamination incurred cannot pass into the bottle opening. Additionally, due to the arrangement beneath the gripper arms, the spring elements and control rollers, which are to be regarded as closing parts, allow for particularly easy and rapid access for replacement.

While with an arrangement of the control unit pin directly at the control unit, the control unit pin is arranged in the vertical direction, i.e., for example in its own longitudinal axial direction, beneath the gripper arms, or, in the installed position, such as in the vertical direction, with the arrangement of the control unit pin at the main body, the control unit pin can be arranged by a control unit pin arm in the vertical direction above the gripper arms. While the arrangement beneath the gripper arms allows for relatively high safeguarding of the containers against dirt contamination, with the arrangement above the gripper arms a compact or minimized configuration of the device is possible.

To improve ease of cleaning and to secure the gripper arms in the gripping position, according to at least one exemplary embodiment a magnetic clamping device is provided, which subjects the container clamp to preliminary tension towards the gripping position, wherein the magnetic clamping device is arranged in such a way that the pivoting of the control unit for the opening of the container clamp takes place against the force of the magnetic clamping device.

The magnetic clamping device is understood to be at least a magnetic body of which the magnetic force opposes a movement of the gripper arms out of the gripping position in the direction of the open position. In this situation the magnetic body can take effect, for example, on ferromagnetic gripper arms or a ferromagnetic control unit. A magnetic body can also be positioned in such a way that, due to its magnetic attraction forces, it draws the gripper arms into the gripping position.

In at least one exemplary embodiment, however, at least two magnetic bodies are arranged on the basis of the mutual attraction or repulsion of which the preliminary tension of the container clamp is produced. With the arrangement of two magnetic bodies, at least one magnetic body can be mounted so as to be movable in relation to the other magnetic body, such that, at a movement of the at least one magnetic body, the magnetic bodies are moved past one another. In this situation, the two magnetic fields of the magnetic bodies influence one another, at least during a section of the movement of the one magnetic body.

The movement can be put into effect by a pivoting movement of one or both magnetic bodies in a horizontal plane, wherein the pivoting movement can take place parallel to a movement plane of the gripper arms.

According to at least one exemplary embodiment, the magnetic clamping device comprises a first magnetic body arranged at the control unit and a second magnetic body arranged at the carrying body. The two magnetic bodies can be arranged in respect of their polarity and proximity in such a way that they repel one another.

The first magnetic body is connected to the control unit in such a way that, at a rotational movement of the control unit about the control unit pin, the first magnetic body moves with it, such as by pivoting or moving in a horizontal plane, such as in the installed position, and is guided past the second magnetic body. For example, the first magnetic body strokes over the first magnetic body during the pivoting movement, but possibly without coming in direct contact with the second magnetic body. The first magnetic body can be positioned at a small or minimized distance interval from the surface of the upper side of the carrying body. With the rotation of the control unit, the first magnetic body therefore moves on a circular or curved section about the control unit pin.

The second magnetic body is arranged, for example, immovably at or in the carrying body, and can form with this the surface of the upper side of the carrying body, or can be located beneath the surface of the carrying body. It is positioned along the circular section.

At the rotational movement, the magnetic fields of the magnetic bodies take effect on the control unit in such a way that, as the magnetic bodies come close, the magnetic fields of both magnetic bodies repel one another, such that the movement of the first magnetic body onto the second magnetic body is made difficult. As soon as the first magnetic body has been guided past the second magnetic body, the first magnetic body is pushed away or repelled by the second magnetic body. The preliminary tensioning of the container clamp is therefore produced due to the fact that, due to the mutual repelling of the two magnetic bodies, the control unit, and the gripper arms of the container clamp connected to the control unit by the control slot pins, are pressed in the direction of the gripping position of the container clamp. In addition to the preliminary tensioning of the container clamp in the open position, this also allows for a preliminary tensioning of the container clamp in the open position to be attained. That is to say, the pivoting of the control unit both for the opening of the container clamp as well as for the closing of the container clamp takes place against the force of the magnetic clamping device.

In other words, the two magnets are designed to repel rather than attract one another. Therefore, a first magnet, such as a movable magnet, is constantly pushed away from a second magnet, such as a stationary magnet. As a result, the gripper arms are also pivoted by this magnetic force into an open, receiving position or into a closed, gripping position. In order to switch between the open and closed positions, the first magnet is moved toward the second magnet by exertion of a physical force, such as via a cam and roller arrangement. As the first magnet approaches the second magnet, the repelling force increases, so the physical force must be sufficient to overcome the resistance to movement. However, once the first magnet is moved to a position directly or substantially overlapping the second magnet, the repelling force switches from resisting the movement of the first magnet toward the second magnet to assisting or contributing to the movement of the first magnet away from the second magnet. So, for purposes of example, if the first magnet is on a first side of the second magnet, then moved past the second magnet to a second, opposite side of the second magnet, the repelling force will at some point switch from resisting movement toward the second magnet on the first side to assisting or encouraging movement away from the second magnet on the second side. In this manner, the gripper arms can be switched from the closed position to the open position, and vice versa. In addition, the repelling force between the magnets enhances or generates the gripping force of the gripper arms on the container, and enhances or generates an opening force to create and maintain a complete opening of the gripper arms.

Depending on the positioning of the first and second magnetic bodies, it is possible to control whether the force taking effect is greater in the direction of the gripping position or in the direction of the opening position, or whether it is of equal strength in both directions. This control can be put into effect by the positioning of the switchover point, i.e., the point at which the two magnetic bodies are arranged exactly opposite one another. Provided that the movement path from the switchover point to the gripping position is shorter than the movement path to the open position, then the preliminary tension in the gripping position is greater than in the open position, and vice-versa. The second magnetic body is arranged at the carrying body, for example in the region of the central longitudinal axis of the container clamp.

The first magnetic body can be mounted on the main body, for example, by a carrying arm. According to at least one exemplary embodiment, however, provision is made for the first magnetic body to be arranged directly at the main body of the control unit. While the configuration of a carrying arm, for example, with the direct bearing mounting of the control unit pin in the main body is one possible configuration, the bearing mounting of the first magnetic body directly in the main body can be utilized as well, such as when the control unit pin is connected to the main body by a control unit pin arm.

According to at least one exemplary embodiment, the magnetic bodies of the clamping device, the actuating device, and the control slot pins are coupled to one another by lever arms engaging at the control unit pin. That is to say, the distribution of force between the actuating device, the two control slot pins, and the magnetic clamping device takes place by way of the common control unit pin, to which all four components are coupled by their respective lever arms. The main body of the control unit can in this connection assume the function of a coupling, since all the structural components are in contact with it, for example by the carrying arms, and they are rotated in common about the control unit pin.

In at least one exemplary embodiment, with an arrangement of the control unit pin directly in the main body, a first lever arm can therefore comprise a carrying arm, which is connected by a first end to the main body of the control unit, and by a second end, opposite the first end, to the magnetic body receiver, which comprises the first magnet. The carrying arm can extend away from the main body of the control unit, for example in or against the direction towards the gripping sections of the container clamp. The carrying arm, with the magnet holder and the magnetic body, can be arranged immovably at the main body of the control unit. Moreover, the carrying arm, the magnet holder, and the main body of the control unit can be configured as one piece. The carrying arm and the magnet holder can therefore be a constituent part of the control unit.

Inasmuch as the control unit pin is mounted on the main body by the control unit pin arm, the first magnetic body can be mounted directly in the main body. With such a configuration, in the final analysis the first magnetic body is connected to the control unit pin by the control unit pin arm, which in turn is connected to the control unit pin or control unit pin receiver and the main body. That is to say, in this case the lever arm of the first magnetic body takes effect between the control unit pin and the main body.

Two further lever arms, such as second and third lever arms, can be provided between the control slot pin receiver and the control unit pin, and a fourth lever arm between the receiver of the actuating device and the control unit pin. In this situation, depending on the structural configuration, the lever arm can be located between the receiver of the actuating device and the control unit pin such as to be congruent, at least in sections, to one of the lever arms between one of the control slot pin receivers and the control unit pin. The lever arms can of course be configured as straight or also as angular.

In an embodiment of the device with the control unit pin mounted directly at the main body, both the lever arms of the control slot pin receiver are may be arranged on opposing sides of the control unit pin, and possibly exhibit an angle in relation to one another of between 160° and 200°, or possibly 180° or approximately 180°. Accordingly, the angle between the lever arm of the receiver of the actuating device and the second lever arm or the third lever arm can amount to between 160° and 200°, or possibly 180° or approximately 180°. The lever arm of the magnetic clamping device or of the control unit pin or first lever arm respectively can be arranged in the same plane as the lever arms of the control slot pin receiver or second and third lever arm and/or of the actuating device receiver or fourth lever arm. One embodiment of the device makes provision for the first lever arm to be arranged between the lever arms of the control slot pin receivers. It can stand at an angle of 90°+/−20° to the two lever arms of the control slot pin receivers.

With the embodiment of the device with a control unit pin mounted at a control unit pin arm, the angle α between the carrying arms can amount to between 25° and 45°, while the control unit pin arm between the carrying arms is may be arranged symmetrically, i.e. the angle between the control unit pin arm and the carrying arm amounts, for example, to α/2. The lever arm of the actuating device in this embodiment can be congruent with one of the lever arms of the control slot pins. Due to the fact that the carrying arms and the control unit pin arm engage at the main body, but the control unit pin is mounted by way of the control unit pin arm on the basic body, the lever arms taking effect between the actuating device and the control unit pin and control slot pins and control unit pin are configured as angular.

As a result of the lever arm system represented here, at a movement of the gripper arms from the gripping position into the open position, the first magnetic body moves with them. When this movement takes place, the first magnetic body, and with it the gripper arms, are pressed in the direction of the open position, due to the opposed polarity of the second magnetic body, until the switchover point, also referred to as the dead point, is reached. As soon as the switchover point has been exceeded, the first magnetic body, and with it the gripper arms, are pressed by the repulsion effect of the second magnetic body in the direction of the gripping position, i.e., the container clamp is subjected to preliminary tension in the direction of the gripping position. At the reverse movement, i.e., from the gripping position into the open position, in the final analysis the same magnetic forces take effect, such that a pretension effect on the container clamp is also produced in the direction of the open position.

With a magnetic clamping device taking effect in both positions of the gripper arms, an active control of the gripper arms can take effect in the direction of the gripping position as well as in the direction of the open position. This can be put into effect, for example, by control cams, which engage at the actuating device, and move the actuating device with the gripper arms and the first magnetic body. With a transport star, the control cams can engage, for example, in the radial direction outwards and inwards at the actuating device, in order to cover both directions of movement of the gripper arms.

Instead of the carrying arms and the main body, for example ring shaped, and/or the receivers, also for example ring shaped, the control slot pin receivers, the receiver of the actuating device and/or the magnetic body receiver can also be arranged directly in or at a correspondingly large main body of the control unit, rotating about the control unit pin. The receivers can be provided as openings and/or cut-outs in the main body, which are configured for the bearing mounting of the control slot pins, the actuating device, and/or the magnetic body receiver. The angles referred to heretofore between the lever arms, which are also derived here, can be retained. Such a main body can be configured in its outer shape, for example, at least in sections as round, or also triangular, as a result of which relatively easy or economical cleaning can be achieved.

It is to be noted that the magnetic clamping device can be assigned as an alternative to the spring element. For example, should a high or substantial preliminary tension in the gripping position be necessary, the magnetic clamping device can additionally also be assigned to the spring element, i.e., the magnetic clamping device and the spring element work together to provide a combined force that is higher than each can provide individually.

In addition to the repulsing forces of the pair of magnets, the holding force in the closed position can also be increased by further magnets which exert attraction. These additional magnets may be provided in the region of one of the two end positions or in both the end positions of the magnetic clamping device at the carrying device. In this situation, such as in the carrying closed position, a further magnetic holding force can be utilized.

The combination with at least one further magnet, which draws the magnetic clamping device in the "closed position" direction of rotation, also permits that the angle which is spanned between the "closed position" and the dead point can be selected as greater, which has a positive effect on the shaping of the slot and also on the self-restricting function, and in this situation enlarges the gripping range.

Accordingly, the angles spanned between the "closed position" and the dead point, and the dead point to the open position, do not have to be equal, since the combination of repelling pairs of magnets in the region of the dead point and attracting pairs of magnets in the angle range of the closing movement allows for a greater distance interval or angle due to the forces being distributed over two pairs of magnets.

It would of course also be possible for a further attracting magnet to provide further support for the open position.

Inasmuch as a transport device comprises several container clamps, a magnetic clamping device may be provided for each container clamp.

As has already been described heretofore, the device can be configured as a transport star. The carrying body is, in that case, for example, an additional component, which is secured to the transport star. In at least one exemplary embodiment, however, the carrying body is a star plate or a star plate segment. The star plate or the star plate segment are core components of the transport star, at which the control unit pin and the gripper arm pins of the container clamps are arranged directly. Due to the configuration of the carrying body as a core component of the transport star, the compactness of the device can be further improved, since the carrying body does not represent an additional component part of the device.

A star plate may be plate-shaped, i.e., configured as flat and even, and can exhibit an at least essentially round form. A star plate segment is understood in this situation to be a component part of the star plate, which, for example, carries one single container clamp. A star plate segment may be configured in such a way that a plurality of identical star plate segments can be assembled together to form one star plate.

As already mentioned, the device can also comprise a plurality of container clamps arranged next to one another. Due to the compactness of the arrangement according to at least one exemplary embodiment, such as the compactness of the container clamps and the direct arrangement of the gripper arms and the control unit on a star plate, with transport stars a relatively small or minimized distance interval of the bottle mid-points can be achieved on the pitch circle of 25.71×π.

DETAILED DESCRIPTION

Figure 1:
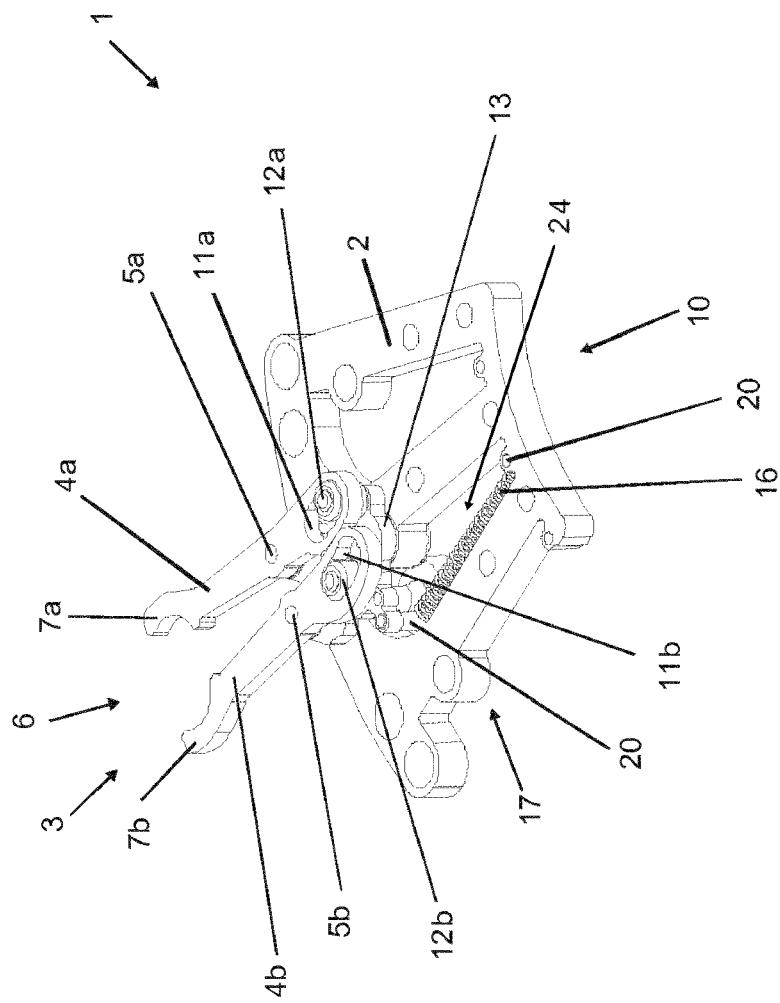
FIG. 1 shows a schematic perspective view of a section of a beverage bottle or container transport device with a container holder in an open or receiving position.

FIG. 1 shows schematically, in a perspective representation, a section from a transport device 1 with a carrying body 2 and a container holder 3 arranged at the carrying body 2. The transport device 1 in this case is a rotating transport star, with which the container holders 3 circulate about a central vertical machine axis. The container holder or clamp 3 comprises two gripper arms 4a, 4b, which are each mounted such as to pivot about a vertical pivot axis of gripper arm pins 5a, 5b. The gripper arm pins 5a, 5b, are in each case arranged between an outer end 6 and an inner end 10, opposite the outer end 6, of the gripper arms 4a, 4b. The gripper arms 4a, 4b, are represented in their open position, i.e., the container clamp 3 is open and ready to receive a container 8 (see FIG. 3 and FIG. 4).

The gripper arms 4a, 4b comprise in each case, at the outer end 6, a gripping section 7a, 7b. The two gripping sections 7a, 7b are configured in common so as to hold the container 8, in this case, for example, a beverage bottle with a neck ring 9 (see FIG. 3).

At the inner end 10, each gripper arm 4a, 4b comprises a control slot 11a, 11b. The control slots 11a, 11b are configured as slightly curved in shape, i.e., the central longitudinal axis of the respective control slots 11a, 11b does not run linearly but has a curved shape or profile. However, in this situation the control slots extend as far as possible in or generally align with the longitudinal axial direction LG (see FIG. 4) of the gripper arms 4a, 4b. Movably mounted in the control slots 11a, 11b, is in each case a control slot pin 12a, 12b. The control slot pins 12a, 12b, are constituent parts of a control unit 13, which is mounted at the carrying body 2 such as to rotate about a single control unit pin 14 (see FIG. 2).

Figure 7:
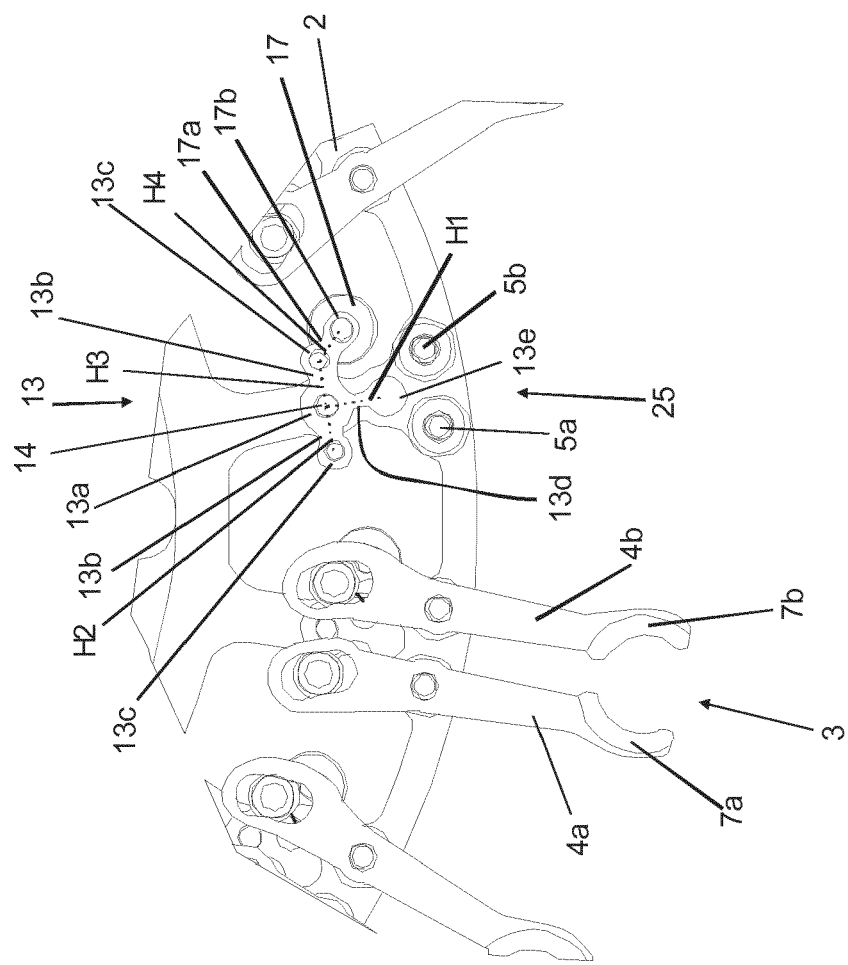
FIG. 7 shows a schematic top view of a portion of the beverage bottle or container transport device shown in FIGS. 5 and 6.

As seen in FIG. 7 and elsewhere, the control unit 13 comprises a main body 13a, which is generally round in shape, and two carrying arms 13b at sections that are generally opposite another, extending out of the main body 13a. Each carrying arm 13b comprises a control slot pin receiver 13c, mounted in which in each case is one of the control slot pins 12a, 12b.

Figure 3:
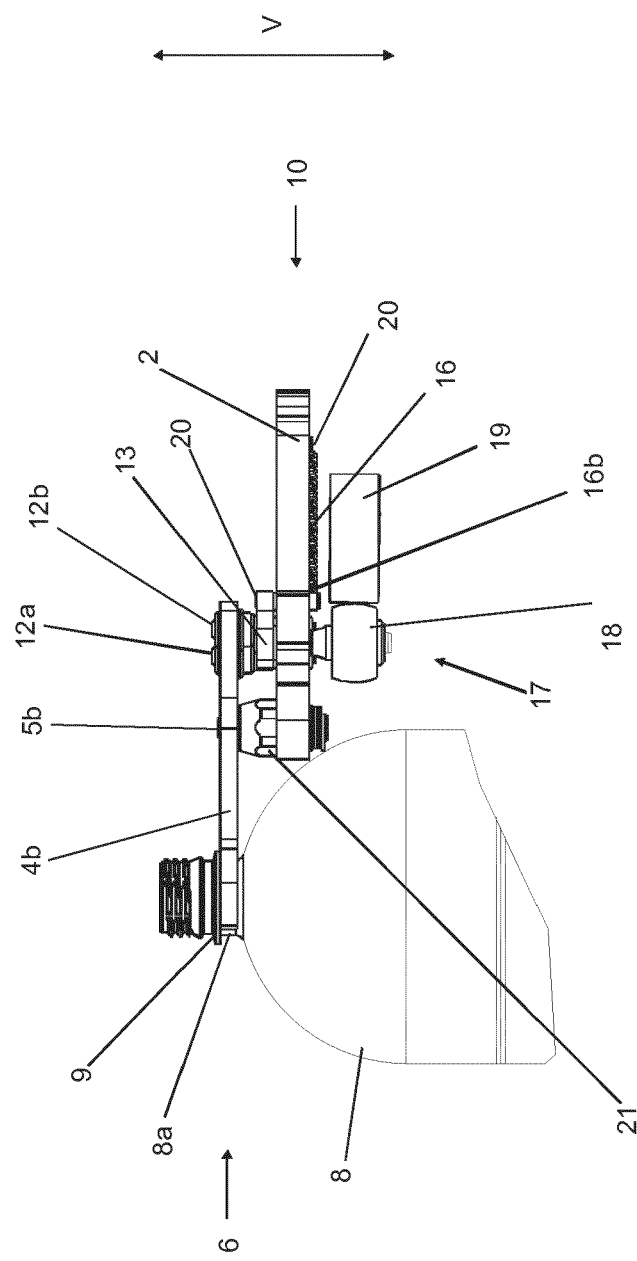
FIG. 3 shows a schematic side view of the section of the beverage bottle or container transport device shown in FIGS. 1 and 2 with the container holder holding or gripping a beverage bottle.

Also arranged at the control unit 13 is an actuating device 17 with a control roller 18 configured so as to actuate by way of a control cam 19 (see FIG. 3).

Figure 2:
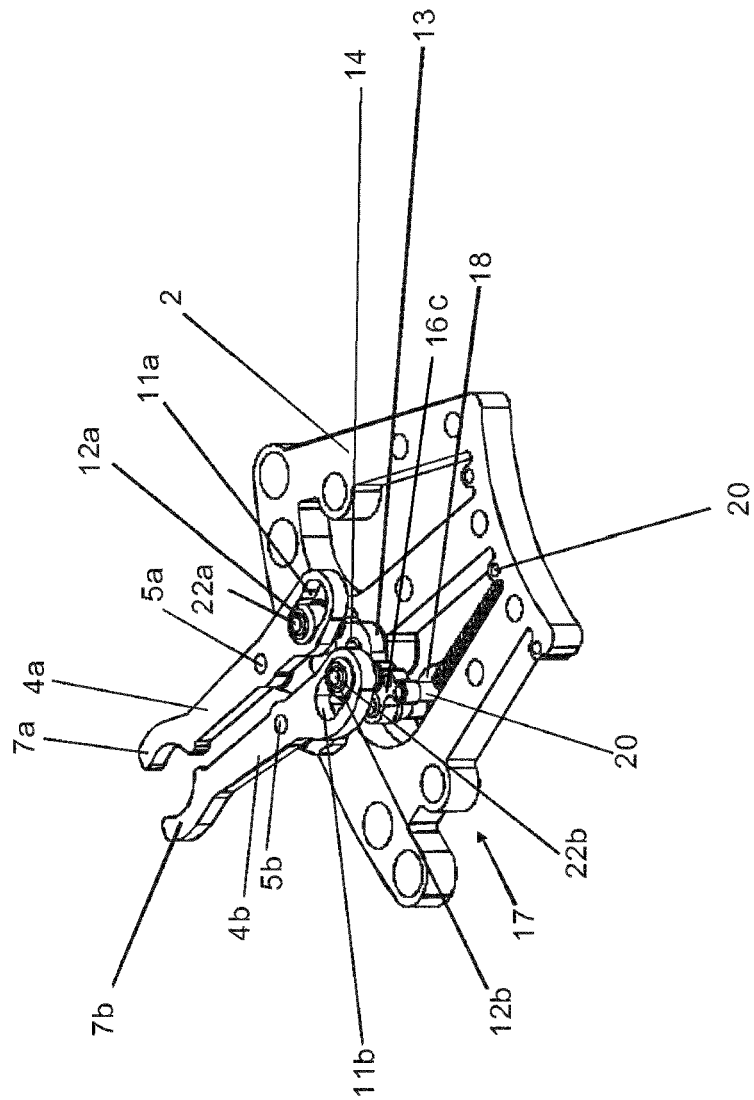
FIG. 2 shows a schematic perspective view of the section of the beverage bottle or container transport device shown in FIG. 1 with the container holder in a gripping position.

The actuating device 17 comprises a further carrying arm 17a (see FIG. 7), extending out of the control slot pin receiver 13c, which is the left-hand receiver in FIG. 2, with a receiver 17b for the control roller 18. The central longitudinal axis, about which the control roller 18 rotates, is arranged parallel to the control unit pin 14.

Also provided is a spring element 16, configured as a tension spring, which subjects the gripper arms 4a, 4b towards the gripping position (see FIG. 2 and FIG. 3). The spring element 16 is connected by a first end 16a to the carrying body 2, and, in this case, by a second end 16b, opposite the first end 16a, to the actuating device 17. For this purpose, arranged at the actuating device 17 and at the carrying body 2 are securing elements, configured as securing pins 20, for securing the spring element 16. In this situation, the securing pin 20 is arranged at the actuating device 17 by a further spring carrying arm 16c, with a spring receiver, extending out of the actuating device 17. As an alternative, the spring element 16 can also be coupled directly to the control unit 13, for example by a spring carrying arm 16c, with a spring receiver and securing pin 20, extending out of the control unit 13.

The control slots 11a, 11b, extend essentially in the direction of the longitudinal axes LG of the gripper arms 4a, 4b (see FIG. 2 and FIG. 4) of the container clamp 3, and are configured as slightly curved in shape. The two control slot pins 12a, 12b, which engage into the control slots 11a, 11b, of the gripper arms 4a, 4b, are arranged offset in the control slots 11a, 11b. That is to say, in the open position of the container clamp 3, a first control slot pin 12a is located in a section of the control slot 11a which is oriented in the direction of the inner end 10 of the first gripper arm 4a, while the second control slot pin 12b is located in the second gripper arm 4b in a section of the control slot 12b which points in the direction of the outer end 6 (gripping sections 7a, 7b). An inverse arrangement is also possible as an alternative.

Also shown in FIG. 1 is the carrying body 2 with its upper side 2.1, wherein assigned to the container clamp 3 is an opening 24, in which the control unit 13 and the actuating device 17 are partially accommodated between the upper side 2.1 and the under side 2.2. Advantageously, the tension spring 16 is also arranged with a portion of its extension in this opening 24. This results in a very flat, compact structure.

The carrying body 2 is configured in this situation as a carrying ring having a grid-like structure or frame referred to heretofore, which can be connected by holding and carrying elements to the transport device 1 or its drive respectively.

In order to close the container clamp 3 or move it into the gripping position (see FIG. 2), the control unit 13 is rotated about the control unit pin 14. In the embodiment represented in FIG. 2, this is done by a left-hand rotation. As a result of this, the first control slot pin 12a slides in the control slot 11a in the direction of the gripping sections 7a, 7b of the container clamp 3, while the second control slot pin 12b moves in the second control slot 11b in the direction of the inner end 10, i.e., the control slot pins 12a, 12b move in the opposite direction in relation to the central longitudinal axis M of the container clamp 3 or, respectively, the longitudinal axes LG of the gripper arms 4a, 4b. The movement of the control slot pins 12a, 12b, occurs simultaneously and in the same rotational direction about the control unit pin 14. As a result of the movement of the control slot pins 12a, 12b, in the control slots 11a, 11b, the gripper arms 4a, 4b, pivot towards one another, i.e., in the direction onto the central longitudinal axis M of the container clamp 3 into the clamping position. To open the container clamp 3, the control unit 13 is rotated back, such as in a right-hand rotation, and the gripper arms 4a, 4b are opened again, such that the control slot pins 12a, 12b, return to their starting position (see FIG. 1).

The closing movement of the gripper arms 4a, 4b into the gripping position in this situation takes place as a result of the spring element 16 exerting drawing tension or force onto the control unit 13. The curved shape of the control slots 11a, 11b ensure or promote that, in the gripping position, a reliable self-restriction function of the gripper arms 4a, 4b, which, for example, prevents or minimizes an unintentional opening of the gripper arms 4a, 4b as a result of their pressing apart in the region of the gripping sections 7a, 7b.

In order to move the gripper arms 4a, 4b from their gripping position (see FIG. 2) into their open position (see FIG. 1 and FIG. 4), a control cam 19 (see FIG. 3) presses the control roller 18 in the direction of the outer end 6 of the gripper arms 4a, 4b, such as radially outwards.

The control unit pin 14, the gripper arm pins 5a, 5b, and the control slot pins 12a, 2b, are elongated structures in the form of pins, rods, axles, or similar structures, which are fixed by split rings 15 (see FIG. 4), although alternative arrangements are conceivable.

FIG. 2 shows the section of the transport device from FIG. 1, with the gripper arms 4a, 4b in the gripping position. The container clamp 3 is closed. The control slot pins 12a, 12b have moved in the control slots 11a, 11b from their starting position, in which the gripper arms 4a, 4b were in their open position (see FIG. 1), to the respective opposite end of the control slots 11a, 11b.

FIG. 3 shows the container clamp 3 likewise in the gripping position. The device 1 is represented in its installation position. It can readily be seen that the gripper arms 4a, 4b are arranged in the vertical direction V, represented by an arrow, at the same height, as a result of which a low structural height is attained. They are also oriented parallel to the plane of the carrying body 2. The control roller 18, the control cam 19, and the spring element 16 are positioned in a vertical direction V beneath the gripper arms 4a, 4b, as a result of which any dirt contamination of the beverage containers 8 can be reliably prevented or minimized. The embodiment represented is configured for the transport of beverage containers 8, such as beverage bottles, which comprise a neck ring 9. For this purpose, the gripper arms 4a, 4b are configured such as to engage beneath the neck ring 9 and to encompass the container 8 at the bottle neck 8a and/or the bottle neck 8a above the neck ring 9. FIG. 3 also shows a housing 21 of the gripper arm pin 5a, 5b, configured as a holding sleeve.

The rotatable mounting of the gripper arms 4a, 4b is effected by the gripper arm pins 5a, 5b, which are rotatably mounted at the carrying body 2. As represented here, the carrying body 2 can be configured as a star plate of a transport star. The carrying body 2 can therefore be configured as plate-shaped and, for example, at least essentially round.

Figure 4:
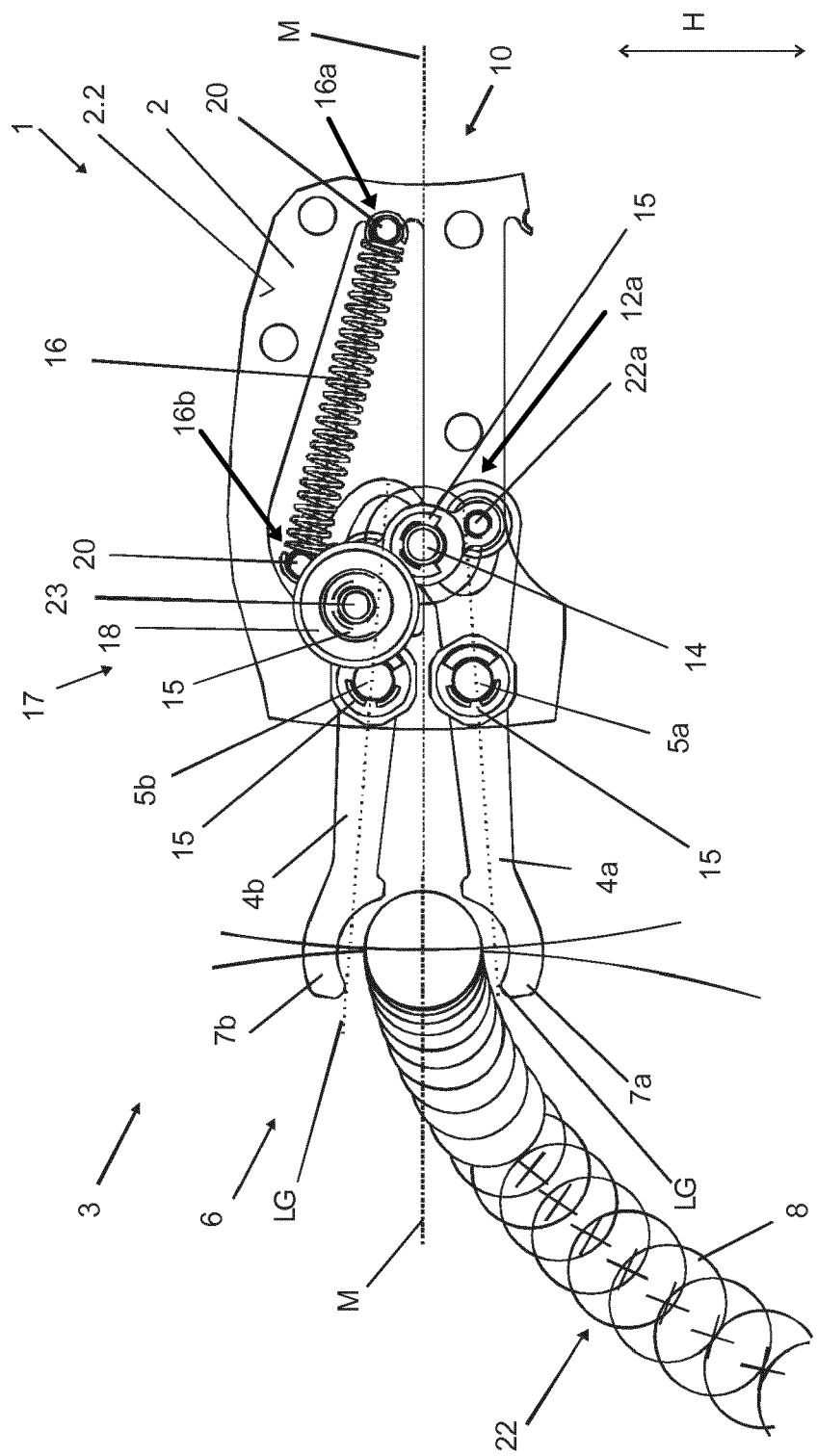
FIG. 4 shows a schematic bottom view of the section of the beverage bottle or container transport device shown in FIGS. 1-3 with the container holder in the open position and a container inlet path.

FIG. 4 shows a section of the transport device 1 from the under side 2.2, with a schematically represented container inlet path 22 between the gripping sections 7a, 7b of the gripper arms 4a, 4b. The embodiment of the transport device 1, represented in FIG. 4, corresponds to the transport device 1 represented in FIGS. 1-3.

FIG. 4 shows that the central longitudinal axis of the control unit pin 14 is arranged on or aligned with the central longitudinal axis M of the container clamp 3, while the gripper arm pins 5a, 5b, as well as the control slot pins 12a, 12b, are arranged on the right and left next to the central longitudinal axis M. That is to say, the control unit pin 14 of the control unit 13 is positioned in the horizontal direction H between the control slot pins 12a, 12b.

The gripper arm pins 5a, 5b, the control unit pin 14, and the central longitudinal axis 22a, 22b of the control slot pins 12a, 12b all point in the vertical direction V and are arranged parallel to one another. Likewise, the securing pins 20 for securing the spring element 16 and the axis of rotation 23 of the control roller 18 extend with their longitudinal axes perpendicular to the plane of the carrying body 2, and therefore also parallel to the gripper arm pins 5a, 5b of the control unit pin 14 and of the control slot pins 12a, 12b.

The carrying body 2 represented in FIGS. 1-4 is, as already described, a section of a star plate of a transport star. It can however also be configured, for example, as a component part separate from the transport star, which can be mounted on a transport star or on another component part of a container transport device.

Figure 5:
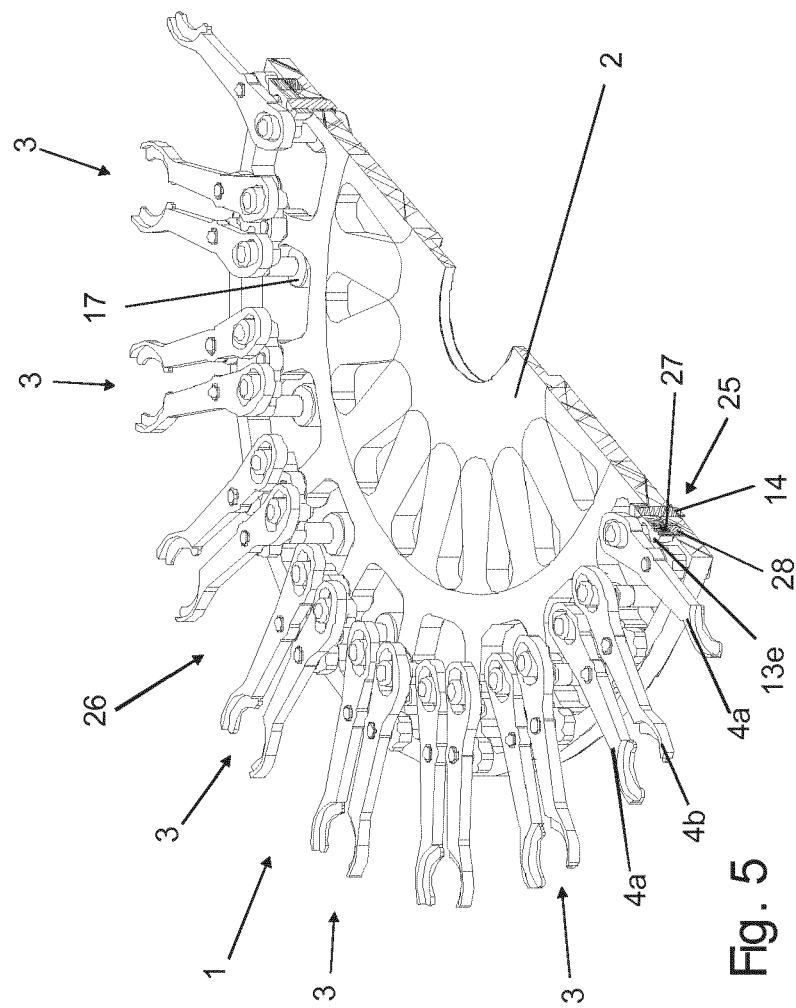
FIG. 5 shows a schematic perspective view of a section of a beverage bottle or container transport device with a plurality of container holders and components thereof.

FIG. 5 shows schematically in a perspective representation a section from a transport device 1, in this case a section from a transport star 26, with a plurality of container clamps 3. The transport device 1 differs from the transport device 1 from FIGS. 1 to 4 by the inclusion of a magnetic clamping device 25 in place of the spring element 16. The magnetic clamping device 25 holds the gripper arms 4a, 4b in the gripping position as well as in the open position, such that an unintentional movement of the gripper arms 4a, 4b is prevented. The magnetic clamping device 25 perceptibly simplifies structural arrangement of the transport device 1, as a result of which cleaning is made easier in comparison with a spring element 16 for producing the preliminary tension.

FIG. 5 shows schematically in a perspective representation a section from the transport device 1 from FIG. 5. One of the container clamps 3 is represented in cross-section, as a result of which the magnetic clamping device 25 can be particularly clearly identified. The magnetic clamping device 25 comprises a carrying arm 13d arranged at the main body 13a of the control unit 13, with a magnetic body receiver 13e, which encompasses a first magnetic body 27. The carrying arm 13d with the magnetic body receiver 13e and with the first magnetic body 26 extend from the main body 13a of the control unit 13 in the direction of the gripping sections 7a, 7b, i.e. in this case in the radial direction outwards. The main body 13a is configured as one piece with the carrying arm 13d and with the magnetic body receiver 13e, and is rotatably mounted at the control unit pin 14.

The first magnetic body 27, in the installation position represented, is arranged at a minimal distance interval from the upper side 2.1 of the carrying body 2, while the second magnetic body 28 is immovably positioned in the carrying body 2. The first and second magnetic bodies 27, 28, are represented here as being at the switchover point, at which both magnetic bodies 27, 28, are directly opposite one another. The two magnetic bodies 27, 28, are arranged in respect of polarity such that they repel each other.

Figure 6:
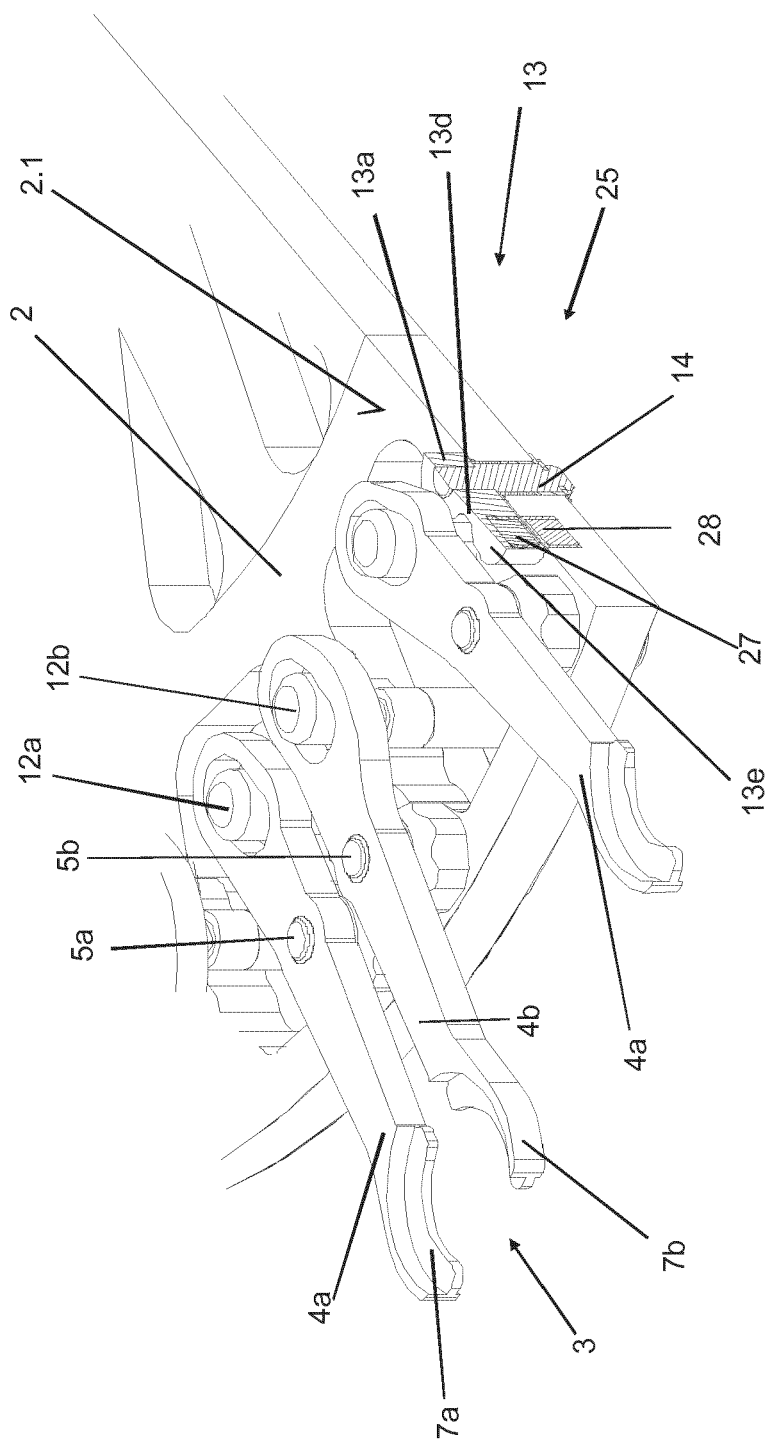
FIG. 6 shows a schematic, close-up, perspective view of a portion of the beverage bottle or container transport device shown in FIG. 5.

FIG. 7 shows in a schematic view from above a section of the transport device 1 from FIGS. 5 and 6. In order to make clear the structural arrangement of the magnetic clamping device 25, at one of the container clamps 3 the gripper arms 4a, 4b have not been represented. As well as the gripper arm pins 5a, 5b, about which the gripper arms 4a, 4b are pivoted between the open position and the gripping position, it can clearly be identified in FIG. 7 that at the main body 13a of the control unit 13, which is generally ring-shaped, and as well as the carrying arm 13d of the magnetic body receiver 13e, the carrying arms 13b of the control slot pin receivers 13c also engage. In addition, from one of the control slot pin receivers 13c, a further carrying arm 17a projects with the receiver for the actuating device 17. The control slot pin receivers 13b and the receiver 17b of the actuating device 17 are configured as being generally ring-shaped. By this coupling, therefore, four lever arms H1-H4 (marked by broken lines) engage at the control unit pin 14. The first lever arm H1 is formed by the main body 13a, the carrying arm 13d, and the magnetic body receiver 13e. The second and third lever arms H2, H3, are in each case formed by the main body 13a, one of the carrying arms 13b, and one of the control slot pin receivers 13c, and the fourth lever arm H4 is formed by the carrying arm 13b with the control slot pin receiver 13c and the carrying arm 17b extending from this, with the receiver 17b of the actuating device 17.

The main body 13a, the engaging carrying arms 13b, 13d, 17a, and the associated control slot pin receivers 13c, magnetic body receiver 13e, and the cut-out 17b of the actuation device 17 are immovable in relation to one another, and in this case, moreover, are configured as being of one piece or unitary or integral. The two control slot pin receivers 13c stand on opposing sides of the axis of the control unit pin 14, and therefore at an angle of approximately 180° to one another. The carrying arm 13d with the magnetic body receiver 13e is arranged at an angle of approximately 90° to the control slot pin receivers, i.e., it is positioned between the control slot pin receivers 13c. All the carrying arms 13b, 13d, 17a with the associated receivers 13c, 13e, 17b are additionally arranged in a plane which, in the installed position, is oriented parallel to the upper side 2.2 of the carrying body 2.

At a rotational movement of the control unit 13, for example, in order to move the gripper arms 4a, 4b between the open position and the gripping position, all the carrying arms 13b, 13d, 17a and the associated receivers, such as the magnetic body receiver 13e, control slot pin receiver 13c, and receiver 17b of the actuating device 17, rotate about the control unit pin 14.

The two magnetic bodies are positioned in such a way that, at a rotational movement of the control unit 13, the first magnetic body 27 moves on a circular or curved path about the control unit pin 14, and thereby strokes or passes over the second magnetic body 28. At the switchover point (see FIG. 6) with the second magnetic body, the two magnetic bodies 27, 28, are located exactly opposite one another or overlapping one another, in this case, in relation to the installed position, in the vertical direction. Due to the fact that the two magnetic bodies 27, 28, are oriented with their polarity in such a way that they repel one another, the control unit 13, starting from the switchover point, is always subject to a force in the direction of or toward an end position, i.e., either in the direction of the gripping position of the gripper arms 4a, 4b or in the direction of the open position of the gripper arms 4a, 4b. Accordingly, for the movement of the gripper arms 4a, 4b between the open position and the gripping position, the repelling force of the magnetic clamping device 25 must always be overcome. This is effected, for example, by one or more control cams, which engage at the actuating device 17.

It can further be seen from FIG. 7 that this embodiment of the transport device 1 does not comprise any spring element 16, any tension spring 16a, 16b, any spring carrying arm 16c, or any spring receiver which corresponds to the embodiments from FIGS. 1 to 4, as a result of which, as already mentioned, can permit an easier or more simplified cleaning, and the manufacture and operation of the device become more economical. This also makes possible very simple and rapid installation and removal of the entire gripper unit.

Figure 8:
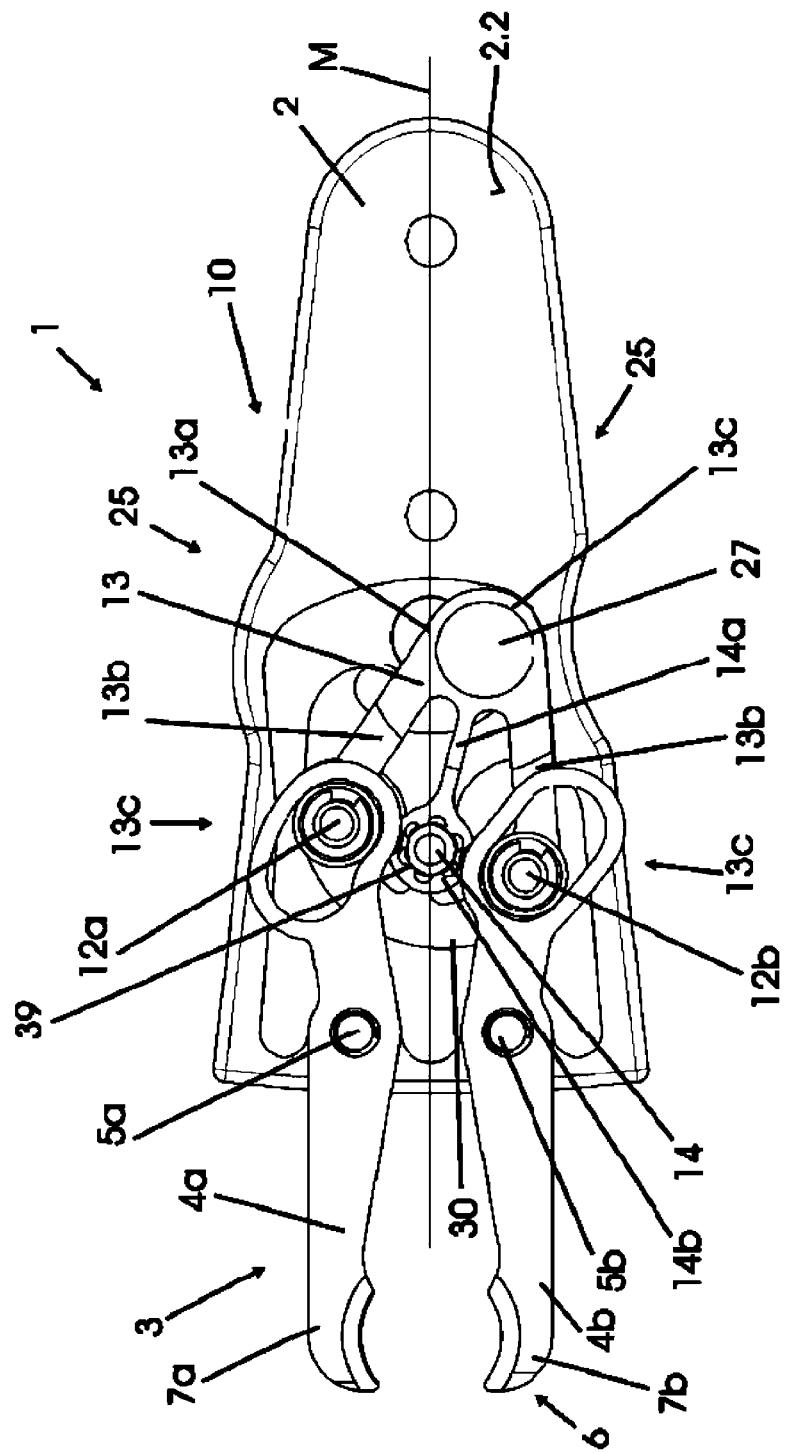
FIG. 8 shows a schematic bottom view of a section of a beverage bottle or container transport device with a container holder.

FIG. 8 shows a further embodiment of the transport device 1, with a carrying body 2, from the under side 2.2. Arranged at the carrying body 2 are a container clamp 3 with two gripper arms 4a, 4b and a control unit 13. The control unit 13 comprises two carrying arms 13b extending out of the main body 13a, which, at their respective ends opposite the main body 13a, comprise a control slot pin receiver 13c (see FIG. 13) with assigned control slot pins 12a, 12b.

With this embodiment, the control unit pin 14 is not arranged directly at the main body 13a, of the control unit 13, but off-center at a control unit pin arm 14a extending out of the main body 13a, with a control unit pin receiver 14b. The control unit pin 14 is arranged in the direction transverse to the central longitudinal axis M (see FIG. 8) of the container clamp 3, between the control slot pins 12a, 12b. In addition, arranged between the control unit pin receiver 14b and the two control slot pin receivers 13c are elastic bearings 29 (see FIG. 13). The elastic bearings 29 are subject to preliminary tension, and exert a force to press the control slot pin receivers 13c away from the control unit pin receiver 14b. The elastic bearings 29 are configured here as elastic toroidal sealing ring sections.

The control unit pin receiver 14a is configured as a sliding bearing with a grooved or toothed inner support or contact portion 38, which, at the rotational movement of the control unit 13, rotates about the control unit pin 14. As a result of the design of the inner support or contact portion 38, small or minimized contact surfaces 39 are present between the control unit pin 14 and the control unit pin receiver 14b. At the rotational movement of the control unit pin receiver 14b at the control unit pin 14, the contact surfaces 39 are therefore alternately exposed, and therefore particularly easy to flush. In other words, instead of the entire inner surface of the control unit pin receiver 14a being continuous and thus in full, uninterrupted contact with the entire outer surface of the portion of the control unit pin 14 container therein, grooves or channels or scoring are formed into the interior surface of the control unit pin receiver 14a so as to form teeth or ridges or peaks and valleys. This design permits the control unit pin receiver 14a to provide adequate support and guidance to the control unit pin 14 with minimal surface contact or physical contact, such that an economical and simple cleaning or flushing of the control unit pin receiver 14a and control unit pin 14 is promoted.

Figure 9:
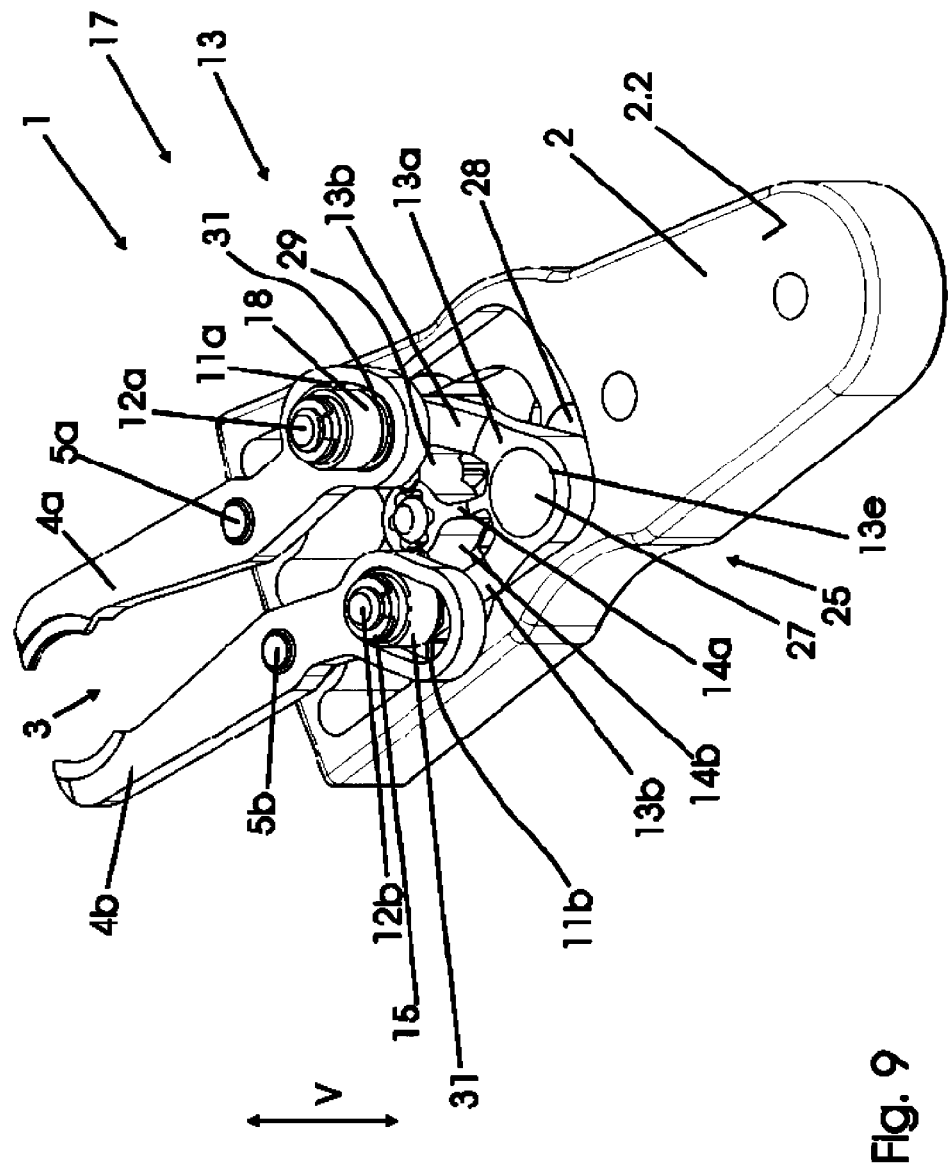
FIG. 9 shows a schematic, bottom, perspective view of the section of the beverage bottle or container transport device shown in FIG. 8.

The gripper arms 4a, 4b of the container clamp 3 are in each case mounted such as to be able to rotate at the carrying body 2 about a gripper arm pin 5a, 5b. As well as the gripping sections 7a, 7b, arranged at an outer end 6, for taking up a container (not represented here), the gripper arms 4a, 4b also comprise in each case a control slot 11a, 11b at an inner end opposite the gripping sections 7a, 7b. The control slots 11a, 11b are configured as closed control slots 11a, 11b. The control slot pins 12a, 12b are mounted so as to be movable in the control slots 11a, 11b. For this purpose, control rollers 31 (see FIG. 9) are arranged at the control slot pins 12a, 12b.

Figure 10:
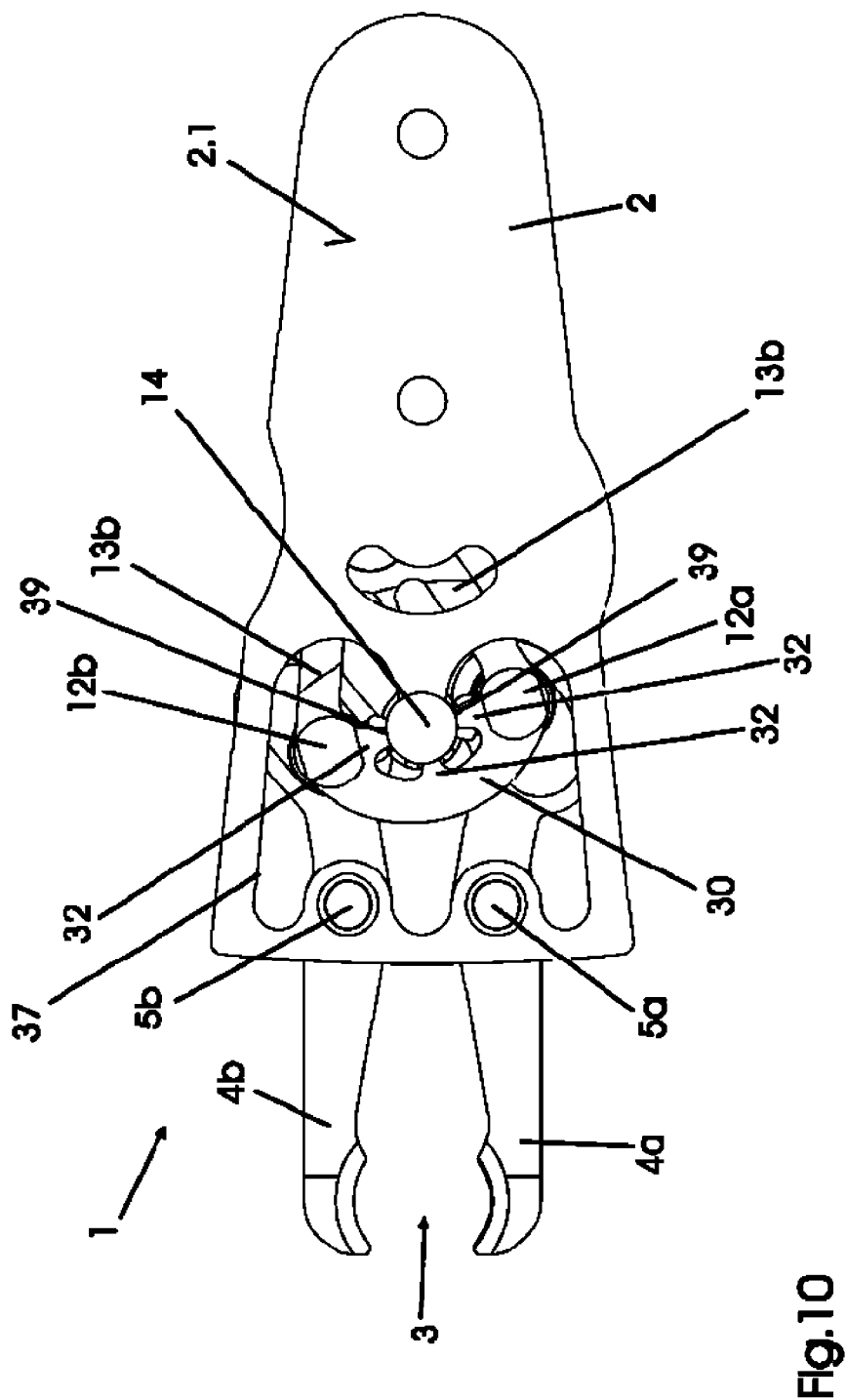
FIG. 10 shows a schematic top view of the section of the beverage bottle or container transport device shown in FIGS. 8 and 9.
Figure 11:
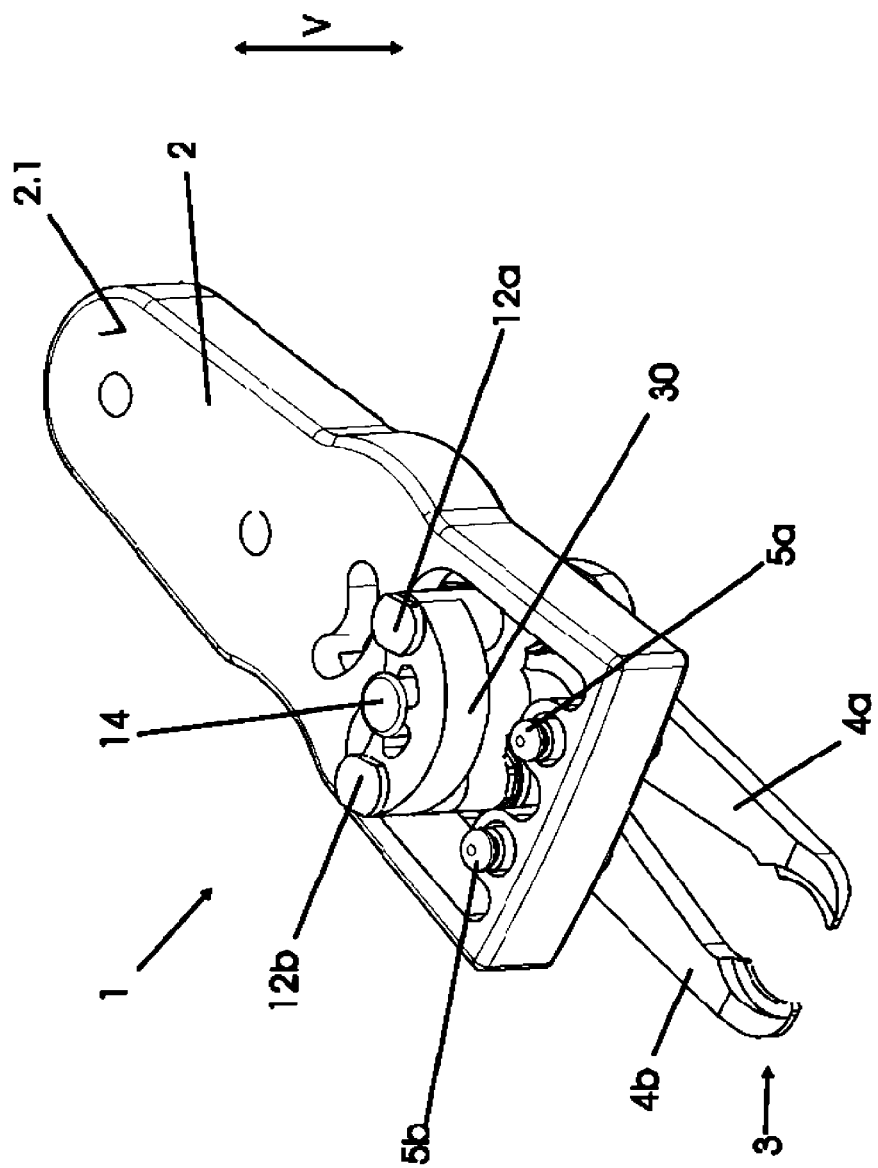
FIG. 11 shows a schematic, top, perspective view of the section of the beverage bottle or container transport device shown in FIGS. 8-10.

In FIG. 10 a bridge 30 can be seen, which connects the two control slot pins 12a, 12b. The bridge 30 is positioned in the vertical direction V (see FIG. 11) above the gripper arms 4a, 4b. The bridge 30 forms, with the two carrying arms 13b and the main body 13, a frame, which keeps constant the distance interval of the two control slot pins 12a, 12b or, respectively, of the control rollers 31 assigned to the control slot pins 12a, 12b. As a result of the elastic bearing arrangement 29 between the control slot pin receivers 13c and the control unit pin receiver 14b, and in the event of lateral forces being incurred onto the container clamp 3, the frame can deflect slightly, such that damage in operation due to lateral forces will be avoided. After a deflection due to lateral forces, the frame, with the control slot pin receivers 13c, is moved back into its normal starting position again due to the pre-tensioned elastic bearings 29.

The bridge 30 is rotatably mounted at the control unit pin 14 by way of bearing sections spaced apart from one another. The bearing arrangement over the bearing sections 32 is similar to the sliding bearing arrangement of the control unit pin receiver 14b, such that, here too, relatively small or minimized contact surfaces 39 of the spaced bearing sections 32 are alternately exposed due to the rotational movement of the bridge 30 at the control unit pin 14, and therefore are relatively easy to flush clean in an economical process.

Figure 14:
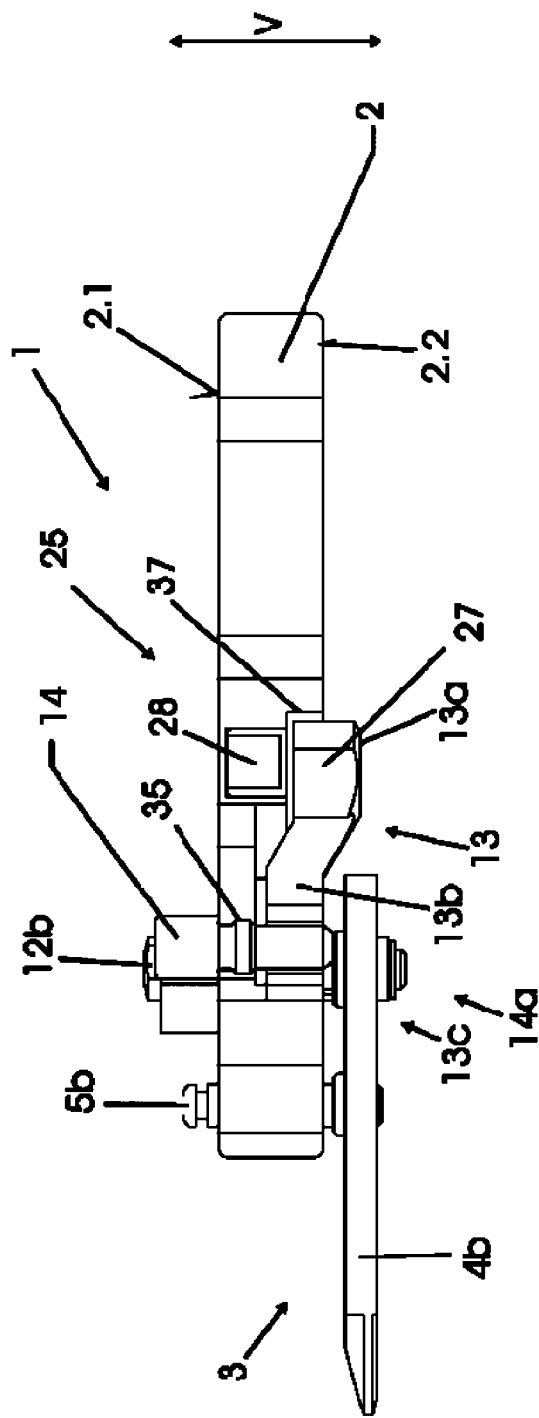
FIG. 14 show a schematic side cross-sectional view of the transport device shown in FIGS. 8-11.

The control unit pin 14 is configured in stepped form along its longitudinal axial direction, and in the region of the bearing sections 32 exhibits a larger diameter than in the region of the control unit pin receiver 14b (see FIG. 14).

In order to hold the gripper arms 4a, 4b in a desired position, a magnetic clamping device 25 is provided. The magnetic clamping device 25 comprises a magnetic body receiver 13e with a first magnetic body 27, which is arranged directly in the main body 13a of the control unit 13. A second magnetic body 28 is arranged in the carrying body 2. The two magnetic bodies 27, 28, lie on a common circular path about the control unit pin 14, but vertically offset in relation to one another. They are arranged so as to be mutually repelling, as a result of which a preliminary tension of the gripper arms 4a, 4b into the respective open position or gripping position is incurred.

Figure 12:
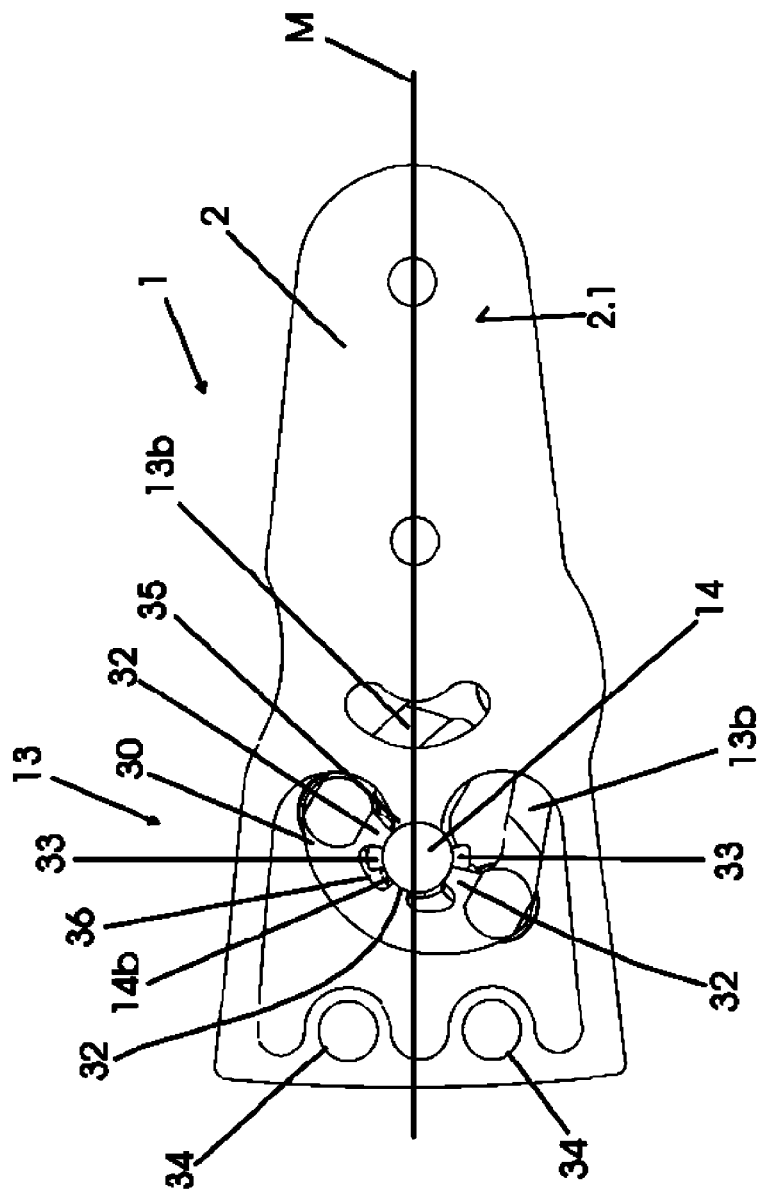
FIG. 12 shows a schematic top view of a portion of the section of the beverage bottle or container transport device shown in FIGS. 8-11.

FIG. 12 shows the carrying body 2 and the control unit 13 from FIGS. 8 to 11. The gripper arms 4a, 4b have been omitted for the purpose of better overview. The carrying body 2 comprises, in addition to two gripper arm pin bearings 34 for accommodating the gripper arm pins 5a, 5b, also a control unit pin bearing 35 for accommodating the control unit pin 14. The gripper arm pins 5a, 5b are secured, for example, by split rings 15.

In order to secure the control unit 13 with the bridge 30, two blocking elements 33 are formed at the carrying body 2, in this case at the control unit pin bearing 35. In this situation, the blocking elements 33 and the bearing sections 32 of the bridge 30 are matched to one another in such a way that, in a removal position (see FIG. 12) of the control unit 13 with the bridge 30, and with the previous disassembly of the gripper arms 4a, 4b, the bridge 30 can be moved past the blocking elements 33 vertically in the direction of the under side 2.2. That is to say, the control unit 13, with the bridge 30, can therefore be dismantled from and fitted to the carrying body 2 vertically in the direction of the underside 2.2 in a relatively simple and economical process. Moreover, no separate securing structures are necessary for securing the control unit 13 to the bridge.

Figure 13:
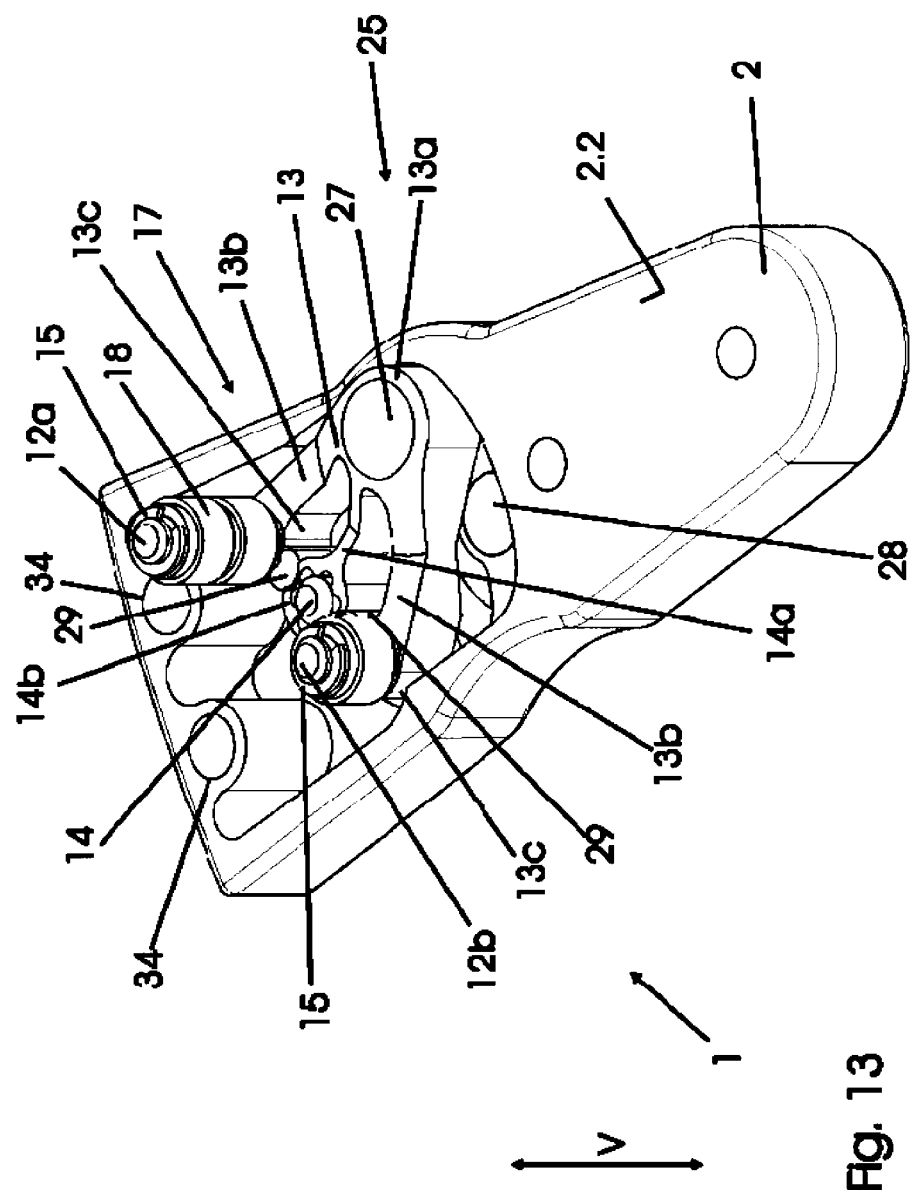
FIG. 13 shows a schematic, bottom, perspective view of the portion of the section of the beverage bottle or container transport device shown in FIG. 12.

FIG. 13 shows the embodiment of the device 1 from FIGS. 8 to 12 without gripper arms 4a, 4b. In addition to the carrying body 2 and the control unit 13, an actuating device 17 can clearly be seen. For the actuating device 17, one of the control slot pins 12a has been configured as elongated in the vertical direction V in the direction of the under side 2.2, i.e., in the installation position downwards. The elongated control slot pin 12a serves as a receiver for a control roller 18, configured so as to engage a control cam. The control roller 18, for actuation by a control cam, and a control roller 31 mounted in the control slot 11a, 11b at a control slot pin 12a, are therefore mounted at a common control slot pin 12a.

FIG. 12 shows the embodiment of the device 1 from FIGS. 8 to 13 in a cross-section. Clearly visible is the stepped formation of the control unit pin 14, and, starting from the under side 2.2, a cut-out/opening 37 in the carrying body 2, in which the control unit 13 is mounted at least in sections. The control unit 13 and, respectively, the carrying arms 13b of the control slot pins 12a, 12b, and the control unit pin arm 14a of the control unit pin 14, are additionally configured as angular, such that the main body 13a of the control unit 13 is arranged in the vertical direction V offset to the control slot pin receivers 13c and the control unit pin receiver 14a.

Due to the angular configuration, the control slot pin receivers 13c and the control unit pin receiver 14a are arranged at least as far as possible between the under side and upper side 2.1, 2.2 of the carrying body 2, while the main body 13a projects over the under side 2.2 of the carrying body 2 as far as into a horizontal plane of the gripper arms 4a, 4b. As a result, the transport device 1 is configured as particularly narrow in the vertical direction V.

The embodiment form from FIGS. 8 to 14 again comprises a lever arm system, with which, by a lever arm, starting from the actuating device 17 and a first control slot pin, and by way of the main body 13a, the force initiated by the control cam for rotating the control unit 13 is transferred onto the control unit pin 14. Starting from the control unit pin, the transfer of force passes by way of further lever arms onto the second control slot pin or, respectively, onto the main body 13a.

The application further discloses a device for transporting containers, comprising a carrying body, on which a container clamp, having two gripper arms for holding a container which are each mounted so as to be pivotable about a pivot axis, is arranged and a control unit for actuating the gripper arms which is rotatable about an axis of rotation.

The following is at least a partial list of components shown in the figures and their related reference numerals: transport device 1; carrying body 2; upper side of the carrying body 2.1; under side of the carrying body 2.2; container clamp 3; gripper arms 4a, 4b; gripper arm pins 5a, 5b; outer end of the gripper arms 6; gripping sections 7a, 7b; beverage container 8; bottle neck 8a; neck ring 9; inner end of gripper arms 10; control slots 11a, 11b; control slot pins 12a, 12b; control unit 13; main body 13a; carrying arms 13b; control slot pin receiver 13c; carrying arm for magnetic body receiver 13d; magnetic body receiver 13e; control unit pin 14; control unit pin arm 14a; control unit pin receiver 14b; split rings 15; spring element 16; first and second end of tension spring 16a, 16b; spring carrying arm 16c; actuating device 17; carrier arm actuating device 17a; actuating device receiver 17b; control roller 18; control cam 19; securing pin 20; housing 21; container inlet path 22; central longitudinal axes of control slot pins 22a, 22b; axis of rotation of control roller 23; opening in the carrying body 24; magnetic clamping device 25; transport star 26; first magnetic body 27; second magnetic body 28; elastic bearing 29; bridge 30; control roller 31; bearing sections 32; blocking element 33; control slot pin bearing 34; control unit pin bearing 35; intermediate space 36; opening/cut-out 37; inner support or contact portion 38; contact surfaces 39; vertical direction V; horizontal direction H; central longitudinal axis of container clamp M; longitudinal axis direction of gripper arms LG; first lever arm H1; second lever arm H2; third lever arm H3; and fourth lever arm H4.

At least one possible embodiment of the present application relates to a device for transporting containers, comprising: a carrying body 2 with a container clamp 3 comprising two gripper arms 4a, 4b for holding a container 8 in the region of its shoulder or neck, wherein each gripper arm 4a, 4b is mounted on the carrying body 2 such as to pivot about a pivot axis of a gripper arm pin 5a, 5b, ideally a vertical pivot axis; a control unit 13 mounted on the carrying body 2 such as to rotate about an control unit pin 14 for actuating the gripper arms 4a, 4b; an actuating device 17 coupled to the control unit 13 for actuating a control cam 19; wherein each gripper arm 4a, 4b comprises at the outer end 6 a gripping section 7a, 7b for receiving the container 8, and at the inner end 10, opposite the outer end 6, a control slot 13, wherein the respective gripper arm pin 5a, 5b is arranged between the two ends 6, 10, and the control unit 13 comprises a rotatably mounted main body 13a with associated control slot pins 12a, 12b, and each control slot pin 12a, 12b enters into the respective control slot 11a, 11b of the gripper arms 4a, 4b or is connected to this in positive fit, wherein, with a rotational movement of the control unit 13, the control slot pins 12a, 12b move in the control slots 11a, 11b, in particular in the opposite direction, and the gripper arms 4a, 4b pivot about the gripper arm pin 5a, 5b between an open position and a gripping position.

At least one possible embodiment of the present application relates to the device, further comprising carrying arms 13b extending out of the main body 13a, wherein a control slot pin 12a, 12b is arranged at each carrying arm 13b.

At least one possible embodiment of the present application relates to the device, wherein the control slots 11a, 11b are configured as essentially or at least in sections as curved in shape.

At least one possible embodiment of the present application relates to the device, wherein the control slot pins 12a, 12b, the gripper arm pins 5a, 5b, and the control unit pin 14 are arranged in parallel.

At least one possible embodiment of the present application relates to the device, wherein the control slots 11a, 11b are arranged next to one another.

At least one possible embodiment of the present application relates to the device, wherein the carrying body 2 comprises an upper side 2.1 and an under side 2.2, and at least for each container clamp 3 a cut-out or opening 24, and wherein the control unit 13 and/or the actuating device 17 are arranged at least partially in the respective opening 24 and between the upper side 2.1 and the lower side 2.2.

At least one possible embodiment of the present application relates to the device, wherein the control unit pin 14 of the control unit 13 is arranged between the control slot pins 12a, 12b, wherein this location of the control unit pin 14 can also lie outside that path which runs as the shortest connection perpendicular to and between the two control slot pins 12a, 12b.

At least one possible embodiment of the present application relates to the device, wherein a control unit pin arm 14a extending out of the main body 13a is arranged with a control unit pin receiver 14b.

At least one possible embodiment of the present application relates to the device, wherein a bridge 30 is arranged so as to connect the control slot pins 12a, 12b.

At least one possible embodiment of the present application relates to the device, wherein in each case an elastic bearing 29 is arranged between the control unit pin arm 14a and the carrying arms 13b of the control slot pins 12a, 12b, which in particular produce a preliminary tension between the control unit pin arm 14a and the carrying arm 13a.

At least one possible embodiment of the present application relates to the device, wherein the gripper arms 4a, 4b in the open position exhibit an opening angle of between 4° to 15°, in particular 5° to 10°, and in the gripping position an opening angle of 0° to 5°, in particular 1° to 3°.

At least one possible embodiment of the present application relates to the device, wherein, between the open position and the gripping position, the control unit 13 runs through an angle of rotation of between −45° to +45°, preferably −30° to +30°, or smaller, wherein these angles must not be identical.

At least one possible embodiment of the present application relates to the device, wherein the device further comprises a spring element 16, which subjects the container clamp 3 to preliminary tension towards the gripping position, wherein the spring element 16 is arranged in such a way that the pivoting of the control unit 13 to open the container clamp 3 takes place against the force of the spring element 16.

At least one possible embodiment of the present application relates to the device, wherein a spring carrying arm 16c is arranged so as to secure the spring element 16.

At least one possible embodiment of the present application relates to the device, wherein the spring element 16 and a control roller 18 are arranged beneath the gripper arms 4a, 4b.

At least one possible embodiment of the present application relates to the device, wherein the device comprises a magnetic clamping device 25, which subjects the container clamp 3 towards the gripping position, wherein the magnetic clamping device 25 is arranged in such a way that the pivoting of the control unit 13 to open the container clamp 3 in a first angle range takes place in the pivot direction against the force of the magnetic clamping device 25, wherein, at the end of this first angle, the maximum repelling magnetic force dead point opposing the pivot direction is located and can be stroked over, wherein, following this, the control unit 13 runs through a second angle range, in which the magnetic force, now taking effect in the pivot direction, moves the magnetic clamping device 25 into the open position.

At least one possible embodiment of the present application relates to the device, wherein the magnetic clamping device 25 comprises a first magnetic body 27 arranged at the control unit 13, and a second magnetic body 28 arranged at the carrying body 2, wherein the magnetic bodies 27, 28 are arranged in respect of their polarity and proximity in such a way that they repel one another.

At least one possible embodiment of the present application relates to the device, wherein the magnetic clamping device 25, in addition to the repelling forces of the pair of magnets, by further magnets which exert attraction force, can increase the retaining force in the closed and/or in the open position.

At least one possible embodiment of the present application relates to the device, wherein at least one further magnet is arranged at the carrying body 2 in the region of one of the two ends of the control unit 13, and that this exerts magnetic attraction on the magnetic body 27 of the control unit 13 in one of the respective end positions.

At least one possible embodiment of the present application relates to the device, wherein the actuating device 17 engages at a control slot pin 12a, 12b.

At least one possible embodiment of the present application relates to the device, wherein the first magnetic body 27 is arranged at the main body 13a of the control unit 13.

At least one possible embodiment of the present application relates to the device, wherein the first magnetic body 27, the actuating device 17, and/or the control slot pins 12a, 12b are coupled to one another by lever arms H1-H4 engaging at the control unit pin 14.

At least one possible embodiment of the present application relates to the device, wherein the carrying body 2 is a star plate or a star plate segment and/or a one-piece or multi-piece module for securing to a star plate or star plate segment.

At least one other possible embodiment of the present application relates to a beverage bottle holding and transport device for holding and transporting beverage bottles and similar containers, said beverage bottle holding and transport device comprising: a support structure and a container clamp supported thereby; said container clamp comprising gripper arms configured to hold a beverage bottle or similar container by a shoulder or neck portion; said gripper arms comprise two gripper arms, each being pivotably connected to said support structure by a corresponding gripper arm pin; each of said gripper arms being configured to pivot about a vertically-oriented longitudinal axis of its corresponding gripper arm pin; a control unit connected to said support structure and being operatively connected to said gripper arms; said control unit being configured and disposed to be rotated about a control unit pin to move said gripper arms; an actuating device being operatively connected to said control unit; said actuating device being configured to be engaged and actuated by a cam structure to move said control unit; each of said gripper arms comprising: a first end portion and a second end portion opposite said first end portion; a gripping section being disposed at said first end portion and configured to contact a portion of a beverage bottle or similar container; and a control slot being disposed at said second end portion; said gripper arm pin of each of said gripper arms being disposed between said first and second end portions; said gripper arms being configured to be moved between an open, receiving position, in which said gripping sections are disposed a first distance apart, and a closed, gripping position, in which said gripping sections are disposed a second distance apart less than said first distance; said control unit comprising a rotatably-mounted main body and control slot pins comprising two control slot pins, one for each of said control slots; each control slot pin being disposed to project into its corresponding control slot to connect said control unit to said gripper arms; and said control unit being configured to be rotated to move said control slot pins in said control slots in opposite directions, toward either said first end portion or said second end portion, to pivot said gripper arms about said gripper arm pins between said open, receiving position and said closed, gripping position.

At least one other possible embodiment of the present application relates to the beverage bottle holding and transport device, wherein: said control unit comprises carrying arms disposed to extend out of said main body; and each of said control slot pins is disposed at a corresponding carrying arm.

At least one other possible embodiment of the present application relates to the beverage bottle holding and transport device, wherein the control slots comprise a curved shape over the length or portions thereof.

At least one other possible embodiment of the present application relates to the beverage bottle holding and transport device, wherein: each of said control slot pins, said gripper arm pins, and said control unit pin has a central longitudinal axis; and said control slot pins, said gripper arm pins, and said control unit pin are disposed such that said central longitudinal axes are parallel or essentially parallel to one another.

At least one other possible embodiment of the present application relates to the beverage bottle holding and transport device, wherein said control slots are arranged adjacent and next to one another.

At least one other possible embodiment of the present application relates to the beverage bottle holding and transport device, wherein: said support structure comprises an upper side and a lower side; said support structure comprises an opening therein; and at least one of said control unit and said actuating device is disposed at least partially in said opening such that at least a portion thereof is disposed between said upper side and said lower side of said support structure.

At least one other possible embodiment of the present application relates to the beverage bottle holding and transport device, wherein said control unit pin of said control unit is disposed between said control slot pins either in a straight line with both said control slot pins or offset from a straight line.

At least one other possible embodiment of the present application relates to the beverage bottle holding and transport device, wherein: said gripper arms are configured such that, upon said gripper arms being in said open, receiving position, said gripper arms together define an opening angle in the range of one of 4° to 15° or 5° to 10°; and said gripper arms are configured such that, upon said gripper arms being in said closed, gripping position, said gripper arms together define an opening angle in the range of one of 0° to 5° or 1° to 3°.

At least one other possible embodiment of the present application relates to the beverage bottle holding and transport device, wherein, upon moving between said open, receiving position and said closed, gripping position, said control unit is configured to rotate over a maximum angle of rotation of one of 90 degrees, or 60 degrees, or less than 60 degrees, wherein the angle of rotation is one of: divided equally between the opening and closing movements or divided unequally between the opening and closing movements.

At least one other possible embodiment of the present application relates to the beverage bottle holding and transport device, wherein said support structure is a star plate or a star plate segment and/or a one-piece or multi-piece module for securing to a star plate or star plate segment.

At least one other possible embodiment of the present application relates to the beverage bottle holding and transport device, wherein: said device further comprises a spring element configured to exert a tension or force on said control unit to pivot said control unit to move said gripper arms of said container clamp into said closed, gripping position; and said control unit is configured to be pivoted against the tension or force of said spring element to move said gripper arms of said container clamp into said open, receiving position.

At least one other possible embodiment of the present application relates to the beverage bottle holding and transport device, wherein: a first end of said spring element is connected to said support structure; and a second end of said spring element is connected to a spring carrying arm of said control unit.

At least one other possible embodiment of the present application relates to the beverage bottle holding and transport device, wherein: said device further comprises a control roller configured to be engaged by a cam; and said spring element and said control roller are disposed beneath said gripper arms in a vertical direction.

At least one other possible embodiment of the present application relates to the beverage bottle holding and transport device, wherein: said device further comprises a control unit pin arm disposed to extend horizontally out of said main body, which control unit pin arm comprises a control unit pin receiver configured to receive said control unit pin; and said device further comprises a bridge disposed to connect said control slot pins.

At least one other possible embodiment of the present application relates to the beverage bottle holding and transport device, wherein: said device further comprises elastic bearings, one disposed between said control unit pin arm and each of said carrying arms of said control slot pins; and said elastic bearings generate a pressing force or tension between said control unit pin arm and said carrying arms.

At least one other possible embodiment of the present application relates to the beverage bottle holding and transport device, wherein: said device further comprises a magnetic clamping arrangement configured to exert a force on said control unit to: hold said control unit and said gripper arms operatively connected thereto in said closed, gripping position or said open, receiving position; and resist pivoting of said control unit upon said control unit being pivoted to move said gripper arms between said closed, gripping position and said open, receiving position; and said magnetic clamping arrangement is configured such that, upon said control unit being pivoted from said closed, gripping position to said open, receiving position, or vice versa, said magnetic clamping arrangement exerts a resistance force that increases over a first predetermined angular distance to resist pivoting of said control unit, at the end of which first predetermined angular distance the resistance force is at a maximum value; and said magnetic clamping arrangement is configured such that, upon said control unit being pivoted over said predetermined angular distance, said magnetic clamping arrangement exerts a decreasing pressing force over a second predetermined angular distance to assist pivoting of said control unit to the other of said closed, gripping position or said open, receiving position.

At least one other possible embodiment of the present application relates to the beverage bottle holding and transport device, wherein said magnetic clamping arrangement comprises a first magnetic body disposed at said control unit and a second magnetic body disposed at said support structure, wherein said magnetic bodies are configured and disposed in respect of their polarity and proximity in such a way that they repel one another.

At least one other possible embodiment of the present application relates to the beverage bottle holding and transport device, wherein: said magnetic clamping arrangement comprises additional magnets configured to exert an attraction force on said control unit to increase the holding force to hold said control unit and said gripper arms operatively connected thereto in said closed, gripping position or said open, receiving position; and at least one further magnet is disposed at said support structure adjacent one of said two ends of said control unit, and configured to exert magnetic attraction on said magnetic body of said control unit in one of said respective end positions.

At least one other possible embodiment of the present application relates to the beverage bottle holding and transport device, wherein: said actuating device engages at one of said control slot pins; and said first magnetic body is disposed at said main body of said control unit.

At least one other possible embodiment of the present application relates to the beverage bottle holding and transport device, wherein said first magnetic body, said actuating device, and/or said control slot pins are connected to one another by lever arms engaging at said control unit pin.

Any numerical values disclosed herein, if any, should be understood as disclosing all approximate values within plus or minus ten percent of the numerical value. Any ranges of numerical values disclosed herein, if any, should be understood as disclosing all individual values within the range of values, including whole numbers, tenths of numbers, or hundredths of numbers.

The entirety of the appended drawings, including all dimensions, proportions, and/or shapes disclosed thereby or reasonably understood therefrom, are hereby incorporated by reference.

All of the patents, patent applications, patent publications, and other documents cited herein, are hereby incorporated by reference as if set forth in their entirety herein.

The corresponding foreign or international patent applications, as originally filed and as published, from which the present application claims the benefit of priority, are hereby incorporated by reference as if set forth in their entirety herein, as follows: International Patent Application No. PCT/EP2019/069008 and Federal Republic of Germany Patent Application No. DE102018121092.2.

The following patents, patent applications, patent publications, and other documents cited in the corresponding foreign or international patent applications listed in the preceding paragraph are hereby incorporated by reference as if set forth in their entirety herein, as follows: US2011266818A1; WO2015082381A2; ITTO20120298A1; WO2016071198A1;

WO2006102983A2; DE102016123640133; DE102015106103A1; DE102012108087A1; and DE102006003142A1.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A beverage bottle holding and transport device for holding and transporting beverage bottles and similar containers, said beverage bottle holding and transport device comprising:
    a support structure and a container clamp supported thereby;
    said container clamp comprising two gripper arms configured to hold a beverage bottle or similar container by a shoulder or neck portion;
    each of said gripper arms being pivotably connected to said support structure by a corresponding gripper arm pin;
    each of said gripper arms being configured to pivot about a vertically-oriented longitudinal axis of its corresponding gripper arm pin;
    a control unit connected to said support structure and being operatively connected to said gripper arms;
    said control unit being configured and disposed to be rotated about a control unit pin to move said gripper arms;
    an actuating device being operatively connected to said control unit;
    said actuating device being configured to be engaged and actuated by a cam structure to move said control unit;
    each of said gripper arms comprising:
        a first end portion and a second end portion opposite said first end portion;
        a gripping section being disposed at said first end portion and configured to contact a portion of a beverage bottle or similar container; and
        a control slot being disposed at said second end portion;
    said gripper arm pin of each of said gripper arms being disposed between said first and second end portions;
    said gripper arms being configured to be moved between an open, receiving position, in which said gripping sections are disposed a first distance apart, and a closed, gripping position, in which said gripping sections are disposed a second distance apart less than said first distance;
    said control unit comprising a rotatably-mounted main body and control slot pins comprising two control slot pins, one for each of said control slots;
    each control slot pin being disposed to project into its corresponding control slot to connect said control unit to said gripper arms; and
    said control unit being configured to be rotated to move said control slot pins in said control slots in opposite directions, toward either said first end portion or said second end portion, to pivot said gripper arms about said gripper arm pins between said open, receiving position and said closed, gripping position.

2. The beverage bottle holding and transport device according to claim 1, wherein:
    said control unit comprises carrying arms disposed to extend out of said main body; and
    each of said control slot pins is disposed at a corresponding carrying arm.

3. The beverage bottle holding and transport device according to claim 2, wherein the control slots comprise a curved shape over the length or portions thereof.

4. The beverage bottle holding and transport device according to claim 3, wherein:
    each of said control slot pins, said gripper arm pins, and said control unit pin has a central longitudinal axis; and
    said control slot pins, said gripper arm pins, and said control unit pin are disposed such that said central longitudinal axes are parallel or essentially parallel to one another.

5. The beverage bottle holding and transport device according to claim 4, wherein said control slots are arranged adjacent and next to one another.

6. The beverage bottle holding and transport device according to claim 5, wherein:
    said support structure comprises an upper side and a lower side;
    said support structure comprises an opening therein; and
    at least one of said control unit and said actuating device is disposed at least partially in said opening such that at least a portion thereof is disposed between said upper side and said lower side of said support structure.

7. The beverage bottle holding and transport device according to claim 6, wherein said control unit pin of said control unit is disposed between said control slot pins either in a straight line with both said control slot pins or offset from a straight line.

8. The beverage bottle holding and transport device according to claim 7, wherein said device further comprises a control unit pin arm disposed to extend horizontally out of said main body, which control unit pin arm comprises a control unit pin receiver configured to receive said control unit pin.

9. The beverage bottle holding and transport device according to claim 8, wherein said device further comprises a bridge disposed to connect said control slot pins.

10. The beverage bottle holding and transport device according to claim 8, wherein:
    said device further comprises elastic bearings, one disposed between said control unit pin arm and each of said carrying arms of said control slot pins; and
    said elastic bearings generate a pressing force or tension between said control unit pin arm and said carrying arms.

11. The beverage bottle holding and transport device according to claim 7, wherein:
    said gripper arms are configured such that, upon said gripper arms being in said open, receiving position, said gripper arms together define an opening angle in the range of one of 4° to 15° or 5° to 10°; and
    said gripper arms are configured such that, upon said gripper arms being in said closed, gripping position, said gripper arms together define an opening angle in the range of one of 0° to 5° or 1° to 3°.

12. The beverage bottle holding and transport device according to claim 11, wherein, upon moving between said open, receiving position and said closed, gripping position, said control unit is configured to rotate over a maximum angle of rotation of one of 90 degrees, or 60 degrees, or less than 60 degrees, wherein the angle of rotation is one of: divided equally between the opening and closing movements or divided unequally between the opening and closing movements.

13. The beverage bottle holding and transport device according to claim 12, wherein:
   said device further comprises a spring element configured to exert a tension or force on said control unit to pivot said control unit to move said gripper arms of said container clamp into said closed, gripping position; and
   said control unit is configured to be pivoted against the tension or force of said spring element to move said gripper arms of said container clamp into said open, receiving position.

14. The beverage bottle holding and transport device according to claim 13, wherein:
   a first end of said spring element is connected to said support structure;
   a second end of said spring element is connected to a spring carrying arm of said control unit;
   said device further comprises a control roller configured to be engaged by a cam; and
   said spring element and said control roller are disposed beneath said gripper arms in a vertical direction.

15. The beverage bottle holding and transport device according to claim 7, wherein:
   said device further comprises a magnetic clamping arrangement configured to exert a force on said control unit to:
      hold said control unit and said gripper arms operatively connected thereto in said closed, gripping position or said open, receiving position; and
      resist pivoting of said control unit upon said control unit being pivoted to move said gripper arms between said closed, gripping position and said open, receiving position; and
   said magnetic clamping arrangement is configured such that, upon said control unit being pivoted from said closed, gripping position to said open, receiving position, or vice versa, said magnetic clamping arrangement exerts a resistance force that increases over a first predetermined angular distance to resist pivoting of said control unit, at the end of which first predetermined angular distance the resistance force is at a maximum value; and
   said magnetic clamping arrangement is configured such that, upon said control unit being pivoted over said predetermined angular distance, said magnetic clamping arrangement exerts a decreasing pressing force over a second predetermined angular distance to assist pivoting of said control unit to the other of said closed, gripping position or said open, receiving position.

16. The beverage bottle holding and transport device according to claim 15, wherein said magnetic clamping arrangement comprises a first magnetic body disposed at said control unit and a second magnetic body disposed at said support structure, wherein said magnetic bodies are configured and disposed in respect of their polarity and proximity in such a way that they repel one another.

17. The beverage bottle holding and transport device according to claim 16, wherein said magnetic clamping arrangement comprises additional magnets configured to exert an attraction force on said control unit to increase the holding force to hold said control unit and said gripper arms operatively connected thereto in said closed, gripping position or said open, receiving position.

18. The beverage bottle holding and transport device according to claim 17, wherein at least one further magnet is disposed at said support structure adjacent one of said two ends of said control unit, and configured to exert magnetic attraction on said magnetic body of said control unit in one of said respective end positions.

19. The beverage bottle holding and transport device according to claim 18, wherein:
   said actuating device engages at one of said control slot pins;
   said first magnetic body is disposed at said main body of said control unit; and
   said first magnetic body, said actuating device, and/or said control slot pins are connected to one another by lever arms engaging at said control unit pin.

20. The beverage bottle holding and transport device according to claim 7, wherein said support structure is a star plate or a star plate segment and/or a one-piece or multi-piece module for securing to a star plate or star plate segment.

* * * * *